(12) United States Patent
Mackie

(10) Patent No.: US 11,501,309 B2
(45) Date of Patent: Nov. 15, 2022

(54) SYSTEMS AND METHODS FOR SELECTIVELY PREVENTING ORIGINATION OF TRANSACTION REQUESTS

(71) Applicant: SHOPIFY INC., Ottawa (CA)

(72) Inventor: Christian Mackie, Montreal (CA)

(73) Assignee: SHOPIFY INC., Ottawa (CA)

( * ) Notice: Subject to any disclaimer, the term of this patent is extended or adjusted under 35 U.S.C. 154(b) by 34 days.

(21) Appl. No.: 17/226,243

(22) Filed: Apr. 9, 2021

(65) Prior Publication Data

US 2022/0245635 A1 Aug. 4, 2022

Related U.S. Application Data

(60) Provisional application No. 63/143,078, filed on Jan. 29, 2021.

(51) Int. Cl.
*G06Q 20/40* (2012.01)
*G06Q 20/32* (2012.01)
*G06Q 30/02* (2012.01)

(52) U.S. Cl.
CPC ....... *G06Q 20/405* (2013.01); *G06Q 20/3224* (2013.01); *G06Q 20/4015* (2020.05); *G06Q 30/0224* (2013.01); *G06Q 30/0239* (2013.01)

(58) Field of Classification Search
CPC ............. G06Q 20/405; G06Q 20/4015; G06Q 20/3224; G06Q 30/0224; G06Q 30/0239
USPC .......................................................... 705/39
See application file for complete search history.

(56) References Cited

U.S. PATENT DOCUMENTS

| | | |
|---|---|---|
| 5,960,411 A | 9/1999 | Hartman et al. |
| 8,255,288 B1 | 8/2012 | Gupta et al. |
| 8,315,918 B1 | 11/2012 | Karonis et al. |
| 9,202,180 B2 | 12/2015 | Denker et al. |
| 9,264,151 B1 | 2/2016 | Emigh et al. |

(Continued)

FOREIGN PATENT DOCUMENTS

WO    WO-2016154249 A1 *  9/2016  ........... G06Q 10/087

OTHER PUBLICATIONS

"A methodology for workload characterization of e-commerce sites," by Daniel A. Menasce; Rodrigo Fonseca; Virgilio A.F. Almeida; and Marco A. Mendes. Proceedings of the first ACM conference on Electronic Commerce. pp. 119-128. Published: 1999. (Year: 1999).*

(Continued)

*Primary Examiner* — Sara C Hamilton

(57) ABSTRACT

Processing transaction requests may be considered a computationally expensive operation for a computing system such as an e-commerce platform. An aspect of the present disclosure relates to systems and methods to reduce the number of transaction requests that are received and/or processed by a computing system. This may reduce demand on the computing system's resources and potentially improve the responsiveness of the computing system. In some embodiments, a set of users is selected based on at least one defined condition for a particular transaction request. Origination of the particular transaction request on behalf of users excluded from the set of users is prevented in order to reduce the number of the particular transaction requests that are received and/or processed by a corresponding computing system.

20 Claims, 12 Drawing Sheets

(56) References Cited

U.S. PATENT DOCUMENTS

| | | |
|---|---|---|
| 10,817,831 B1 | 10/2020 | Polyanskiy |
| 2006/0173750 A1 | 8/2006 | Naley et al. |
| 2008/0209223 A1 | 8/2008 | Nandy et al. |
| 2009/0228368 A1 | 9/2009 | Brown |
| 2011/0029370 A1 | 2/2011 | Roeding et al. |
| 2011/0082769 A1 | 4/2011 | Hatfield |
| 2011/0264555 A1 | 10/2011 | Turner-Rielle |
| 2012/0078673 A1 | 3/2012 | Koke et al. |
| 2013/0007875 A1 | 1/2013 | Jakobsson et al. |
| 2013/0311375 A1 | 11/2013 | Priebatsch |
| 2013/0339071 A1 | 12/2013 | Hirose et al. |
| 2014/0279279 A1 | 9/2014 | Wilman Rego et al. |
| 2018/0240181 A1 | 8/2018 | Lopez et al. |
| 2020/0394673 A1* | 12/2020 | Roberts .............. G06Q 30/0236 |
| 2021/0272172 A1 | 9/2021 | Manders et al. |

OTHER PUBLICATIONS

Final Rejection issued on U.S. Appl. No. 16/802,744, dated Sep. 14, 2021. 21 pages.

Goradia, Ruby, "What is Captcha & Why It is Important for eCommerce Site?". Accessed on Apr. 25, 2022. Retrieved from https://ecommerceacademy.in/what-is-captcha-why-it-is-important-for-ecommerce-site/. Published in 2022 (exact date of publication in 2022 is not listed and is unknown), 9 pages.

Non-Final Rejection issued on U.S. Appl. No. 16/802,744, dated Apr. 14, 2021, 25 pages.

* cited by examiner

FIG. 2

SYSTEMS AND METHODS FOR SELECTIVELY PREVENTING ORIGINATION OF TRANSACTION REQUESTS

CROSS-REFERENCE TO RELATED APPLICATIONS

This application claims the benefit of U.S. Provisional Application No. 63/143,078, filed Jan. 29, 2021, the entire contents of which is incorporated herein by reference.

FIELD

The present application relates to managing transaction requests at a computer system, and in particular embodiments, to managing transaction requests in online commerce.

BACKGROUND

Online shopping enables customers to quickly and conveniently purchase products. As the popularity of online shopping has grown, so too has the demand on resources at computing systems that implement online shopping. Managing these resources to maintain a smooth and responsive online shopping experience for customers remains a challenge.

SUMMARY

Some embodiments of the present disclosure provide computer-implemented systems and methods to reduce the number of transaction requests that are received and/or processed by a computing system. Reducing the number of transaction requests may decrease demand on the system's resources and potentially improve the responsiveness of the system.

In some embodiments, a set of users is defined for a particular transaction request associated with an online store. This transaction request may be an order for a product that is sold through the online store, for example. The users in the set may be selected based on merchant-defined conditions and/or supplier-defined conditions for the product. Users belonging to the set might be permitted to send the transaction request to a computing system that implements the online store, whereas users that are excluded from the set might not even be provided with an option to send the particular transaction request to the system. Therefore, the system does not need to commit any resources to processing the transaction request on behalf of users that are excluded from the set. In some cases, the users excluded from the set might be users that would have had their transaction requests rejected by a corresponding merchant. In this way, by selecting the set of users before transaction requests are created, the system may avoid receiving and/or processing any transaction requests that would be ultimately rejected.

According to an aspect of the present disclosure, there is provided a computer-implemented method that includes selecting a set of users based on at least one defined condition for a particular transaction request, and preventing origination of the particular transaction request on behalf of users excluded from the set of users. In some embodiments, the method further includes obtaining online activity information pertaining to a plurality of users and determining, based on the online activity information, that each user of the plurality of users is a candidate for sending the particular transaction request to a computing system. In these embodiments, the set of users may be selected from the plurality of users.

In some embodiments, selecting the set of users includes comparing the at least one defined condition to user information pertaining to the plurality of users. This user information may include labels assigned to the plurality of users by the computing system. Non-limiting examples of user information include an assessment of automated user activity and location data.

In some embodiments, preventing origination of the particular transaction request on behalf of the users excluded from the set of users includes generating an instruction to render a web resource for a user excluded from the set of users, the web resource excluding an option to send the particular transaction request. For example, the instruction to render the web resource for the user excluded from the set of users may deny the user excluded from the set of users an option to purchase an associated product from the computing system.

In some embodiments, preventing origination of the particular transaction request on behalf of the users excluded from the set of users includes transmitting a record of the set of users to the computing system.

In some embodiments, preventing origination of the particular transaction request on behalf of the users excluded from the set of users includes assigning each user in the set of users a label for the particular transaction request.

In some embodiments, the method further includes receiving the at least one defined condition from a device associated with the particular transaction request, such as a merchant device, for example.

In some embodiments, the method further includes determining a number of the particular transaction requests that can be processed and completed at the computing system. This may correspond to the number of items sold via the transaction request, for example. The method may then include selecting a subset of users from the set of users based on the number of the particular transaction requests and processing the particular transaction request for each user of the subset of users.

According to another aspect of the present disclosure, there is provided a system including a memory to store user information, online activity information, defined conditions and/or records of user sets, and one or more processors to perform any method as disclosed herein.

According to a further aspect of the present disclosure, there is provided a non-transitory computer readable medium storing computer executable instructions which, when executed by a computer, cause the computer to perform any method disclosed herein.

BRIEF DESCRIPTION OF THE DRAWINGS

Embodiments will be described, by way of example only, with reference to the accompanying figures wherein:

FIG. 2 is an example of a home page of an administrator, according to an embodiment;

DETAILED DESCRIPTION

For illustrative purposes, specific example embodiments will now be explained in greater detail below in conjunction with the figures.

Example e-Commerce Platform

Although not required, in some embodiments, the methods disclosed herein may be performed on or in association with a commerce platform, which will be referred to herein as an e-commerce platform. Therefore, an example of an e-commerce platform will be described.

Figure 1:
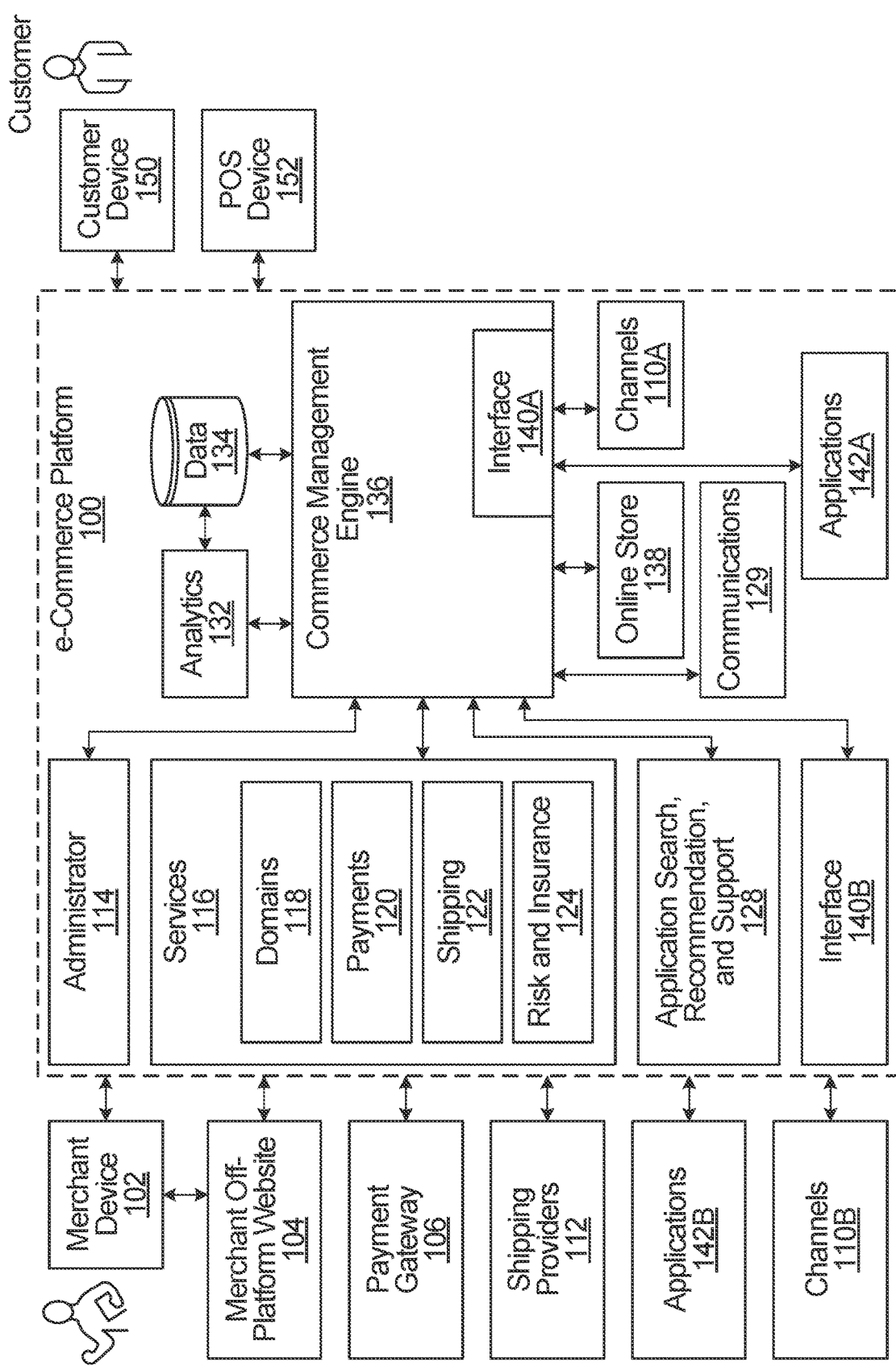
FIG. 1 is a block diagram of an e-commerce platform, according to an embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
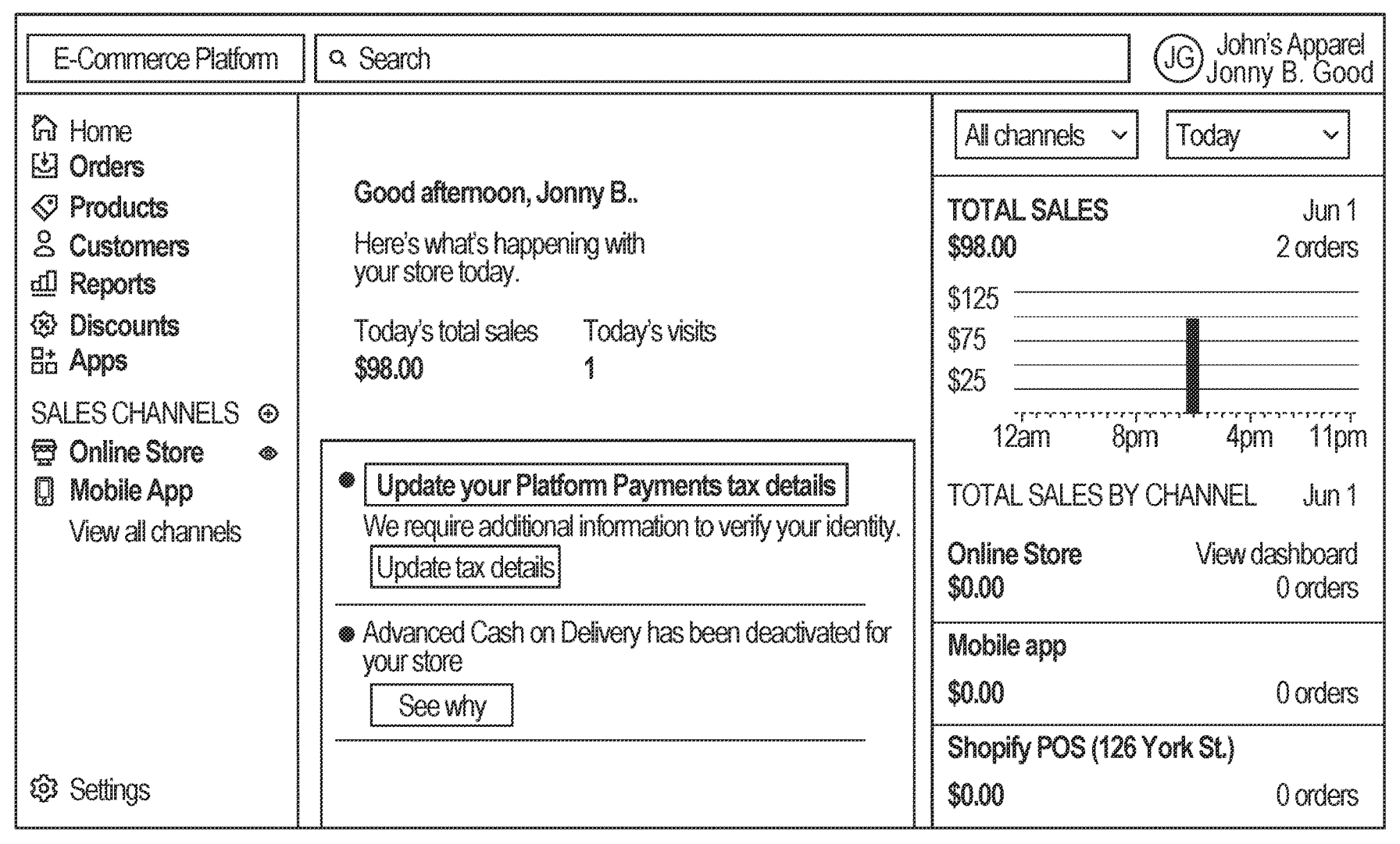

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Transaction Requests at an e-Commerce Platform

Some operations performed by a computing system (such as an e-commerce platform, for example) may be computationally expensive. Expensive operations may require relatively large proportions of storage resources, processing resources, communication resources and/or other resources. In one example, an operation that requires a large amount of memory space to complete may be considered an expensive operation. In another example, an operation that requires a large amount of processing power, number of processors, number of processor cores and/or amount of processing time may be considered an expensive operation. In a further example, an operation that requires transmitting or receiving multiple messages and/or a relatively large message may be considered an expensive operation. In yet a further example, operations consumptive of resources of more than one type may be considered expensive. For example, such expensive operations may be those that consume a lot of, all of, or some of more than one type of resource, or those that consume a lot of any of a number of types of resources. In a particular example, operations that require a large amount of memory space and a large amount of processing power may be considered expensive. Alternatively, in another particular example, operations that require a large amount of memory space or a large amount of processing power may be considered expensive.

For an e-commerce platform, processing a transaction request is an example of a potentially expensive operation. Notably, processing such a transaction may consume resources of a variety of types such as, for example, the types of resources discussed above. For example, memory may be consumed in processing a transaction request and a significant number of processor operations may be performed in that processing. As used herein, a transaction request may include any form of computer-implemented request for a commercial and/or financial transaction. In the field of online commerce, a transaction request may include a request originating from a customer device that is received by an e-commerce platform. For example, a transaction request may include a product order that is placed through an online store. This product order may be considered a request for a transaction in which payment is exchanged for goods or services. Processing the transaction may include facilitating a payment from a customer to a merchant, reserving an item of a product for the customer, and/or arranging transport (i.e., fulfillment) of the item from the merchant to the customer. However, in some cases, facilitating the actual transport of item to the customer might not form part of processing a transaction request.

As mentioned above, processing a transaction request may involve storing and/or processing a relatively large amount of transaction data. This transaction data may include customer contact information, billing information, shipping information and/or any other information associated with business through an e-commerce platform, for example. Processing transaction requests may also include transmitting and receiving operations between different systems and devices, including an e-commerce platform, a customer device, a merchant device, a device executing a third-party application, a payment gateway and a shipping provider, to name but a few.

Due to the relatively high demands that transaction requests may have on computing resources, a transaction processing platform, such as, for example, an e-commerce platform, may only be able to process a limited number of transaction requests over a given period of time. Implementing queues of transaction requests is one conventional method for handling a surge of transaction requests that exceeds the capacity of the e-commerce platform's computing resources. However, queues may degrade the responsiveness of the e-commerce platform and worsen customer experiences. Managing a large queue effectively can add additional computational load on the system, including on client devices who may need to check in periodically to determine their queue status, and on platform devices (servers) who must operate the management system to respond to all client requests. A need exists for systems and methods to reduce the resource demand caused by transaction requests at an e-commerce platform.

Figure 3:
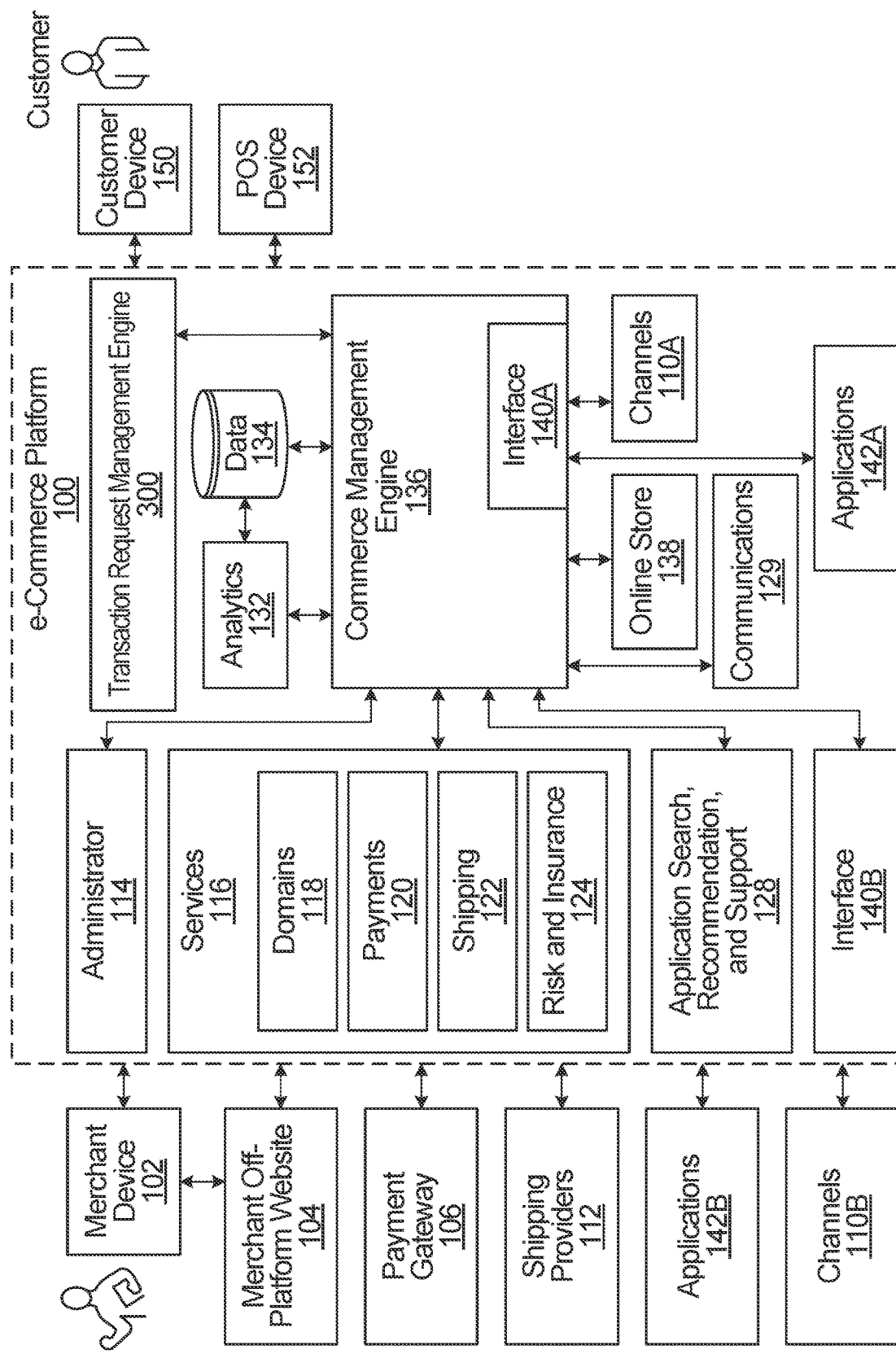
FIG. 3 illustrates the e-commerce platform of FIG. 1, but including a transaction request management engine.

As an example of a possible transaction processing platform in which the subject matter of the present application may be employed, FIG. 3 illustrates the e-commerce platform 100 of FIG. 1, but including a transaction request management engine 300. The transaction request management engine 300 is an example of a computer-implemented system for managing, regulating, controlling, reducing and/or limiting the transaction requests that are implemented by (for example, received and/or processed by) the e-commerce platform 100. This may conserve resources at the e-commerce platform 100 in a manner that does not reduce sales for merchants and/or does not degrade customer experiences. For example, the transaction request management engine 300 may prevent surges of transaction requests that exceed the processing capacity of the e-commerce platform 100, and therefore may prevent the formation of queues of transaction requests.

Although the transaction request management engine 300 is illustrated as a distinct component of the e-commerce platform 100 in FIG. 3, this is only an example. In some embodiments, the commerce management engine 136 and/or the applications 142A provides a transaction request management engine. A transaction request management engine could also or instead be implemented within an online store 138 to help manage transaction requests for that online store. Such an online store may be supported by an e-commerce platform, similar to the online store 138, for example, or may be external to an e-commerce platform. An e-commerce platform could include multiple transaction request management engines that are provided by one or more parties. The multiple transaction request management engines could be implemented in the same way, in similar ways and/or in distinct ways.

A transaction request management engine may also or instead be offered as a stand-alone component or service that is external to a platform such as, for example, the e-commerce platform 100. In some implementations, at least a portion of a transaction request management engine is implemented on a merchant device. For example, the merchant device 102 could store and run a transaction request management engine locally as a software application. Separating the functionality of a transaction request management engine from the functionality of the e-commerce platform 100 may help improve the responsiveness of the e-commerce platform 100. For example, the transaction request management engine may use separate computing resources to perform its functions, which could allow the e-commerce platform 100 to conserve computing resources for performing core commerce functionality, such as processing transaction requests, for example.

The transaction request management engine 300 may implement at least some of the functionality described herein. As mentioned above, although the embodiments described below may be implemented in association with an e-commerce platform, such as (but not limited to) the e-commerce platform 100, the embodiments described below are not limited to the specific e-commerce platform 100 of FIGS. 1 to 3. Further, the embodiments described herein do not necessarily need to be implemented in association with or involve an e-commerce platform at all. The embodiments described herein may be more generally implemented by any system, device and/or platform.

Selectively Preventing Origination of Transaction Requests

In some embodiments, a transaction request management engine selects or otherwise obtains a set of users for a particular transaction request implemented by an e-commerce platform. This transaction request may be an order for a product sold in an online store of the e-commerce platform, for example. Users belonging to the selected set of users might be permitted to create the transaction request and/or send the transaction request to the e-commerce platform. By way of example, if a user device is associated with a user that is included in the set (for example, the user device is signed onto a user account on the e-commerce platform of a user included in the set), then the transaction request management engine may enable the user device to create the transaction request and send the transaction request to the e-commerce platform. In the case that the transaction request relates to an order for a product, the e-commerce platform may output a product page of an online store to the user device that includes an option to purchase the product (for example, a "buy" button for the product). Selection of this option may send the transaction request to the e-commerce platform, where the transaction request may be processed to complete the sale of the product to the user.

In contrast, users that are excluded from the set of users might not be provided with an option to send the particular transaction request to the e-commerce platform. If a user device is associated with a user that is not included in the set, then the transaction request management engine may prevent the user device from creating the transaction request and/or sending the transaction request to the e-commerce platform. For example, in the case that the transaction request relates to an order for a product, a product page might not be output to the user device. Alternatively, the product page might not include an option to purchase the product when output to the user device, or the option to purchase the product might be disabled when output to the user device. These are examples of selectively preventing origination of the particular transaction request on behalf of users that are excluded from the set of users. Advantageously, the e-commerce platform might not need to commit any computing resources to processing the particular transaction request for users excluded from the set, thereby allowing consumption of computing resources to be controlled and/or limited.

Consider, by way of example, an online "flash sale" or "product drop". A flash sale may be the sale of a new or exclusive product that is scheduled for a particular time. The sale may include only a limited number of items of the product, and therefore demand for the product may exceed supply during the flash sale. A flash sale may be facilitated or implemented by an online store. For example, a flash sale may occur when a merchant begins to offer a product for sale in their online store at a predetermined time.

During a flash sale for a product in an online store, a relatively large number of transaction requests for the product may be received by the computing system implementing the online store in a short period of time. This may put strain on the limited computing resources available at the system and may result in delayed responses or even timeouts for some customers. Further, many of these transaction requests may be, in effect, spurious or might not result in a complete transaction as sufficient inventory of a flash sale item may not be available to fulfill all of the requests. For some or all of the foregoing reasons, reducing the number of transaction requests that are received by the system during a flash sale, without degrading the customer experience or reducing sales, may be desirable.

A transaction request management engine may be used by an online store or, more generally, by a system implementing an online store, to reduce the number of transaction requests that are received by the online store during a flash sale. In some embodiments, a set of users is selected by the transaction request management engine and provided to an online store. Only those users in the set may be permitted to submit a transaction request for the product during the flash sale. The selection of users may occur asynchronously with the flash sale. For example, the users may be preselected seconds, minutes, hours, days, weeks or months before the flash sale begins.

In some cases, the selection of users prior to a flash sale may help prevent the generation of transaction requests that a merchant would have rejected anyways. For example, a merchant may want to exclude known or suspected resellers from purchasing an exclusive product during a flash sale. A reseller may be a user that frequently buys exclusive products with a view to resell the products for a profit. A merchant may exclude resellers to help ensure that only genuine customers are being sold an exclusive product. The merchant may also or instead want to limit the flash sale to customers residing in a particular region.

In order to reduce the number of transaction requests sent by ineligible customers, a merchant may define a set of conditions for the flash sale. These conditions may be provided to a transaction request regulation engine, and a set of users may be selected based on these conditions. Only users belonging to the set may be permitted to send a transaction request for the product to the merchant's online store. In this way, the e-commerce platform providing the online store may avoid committing computing resources to receiving, managing, and/or processing transaction requests for the product that might be subsequently rejected or cancelled by the merchant. Additionally or alternatively, in some cases, selecting the set of users before the flash sale begins may allow an online store to perform complex analytics that might not be feasible to perform in real-time during the flash sale, thereby potentially allowing the online store to more effectively select users that meet the merchant's conditions. An example of such complex analytics is determining, from a set of customers that are interested in an exclusive product, a set of customers that are eligible to purchase the product and a set of customers that are ineligible to purchase the product.

While the selection of a set of users requires some computing resources, the selection process may be computationally less demanding than processing a transaction request from every interested user. Further, the computing resources used to select a set of users may be allocated so as to not degrade the functionality of an online store and/or an e-commerce platform. For example, selecting a set of users may be performed before a flash sale occurs, when computing resources are not as constrained, and/or over a longer period of time than is available during the flash sale itself. Further, the selection of a set of users might be performed by a transaction request management engine that is separate from the computing system responsible for processing transaction requests. The transaction request management engine might select the set of users and provide the set of users to that computing system. Therefore, the computing system might not have to commit any resources to selecting the set of users.

Example Systems and Methods for Managing Transaction Requests

Figure 4:
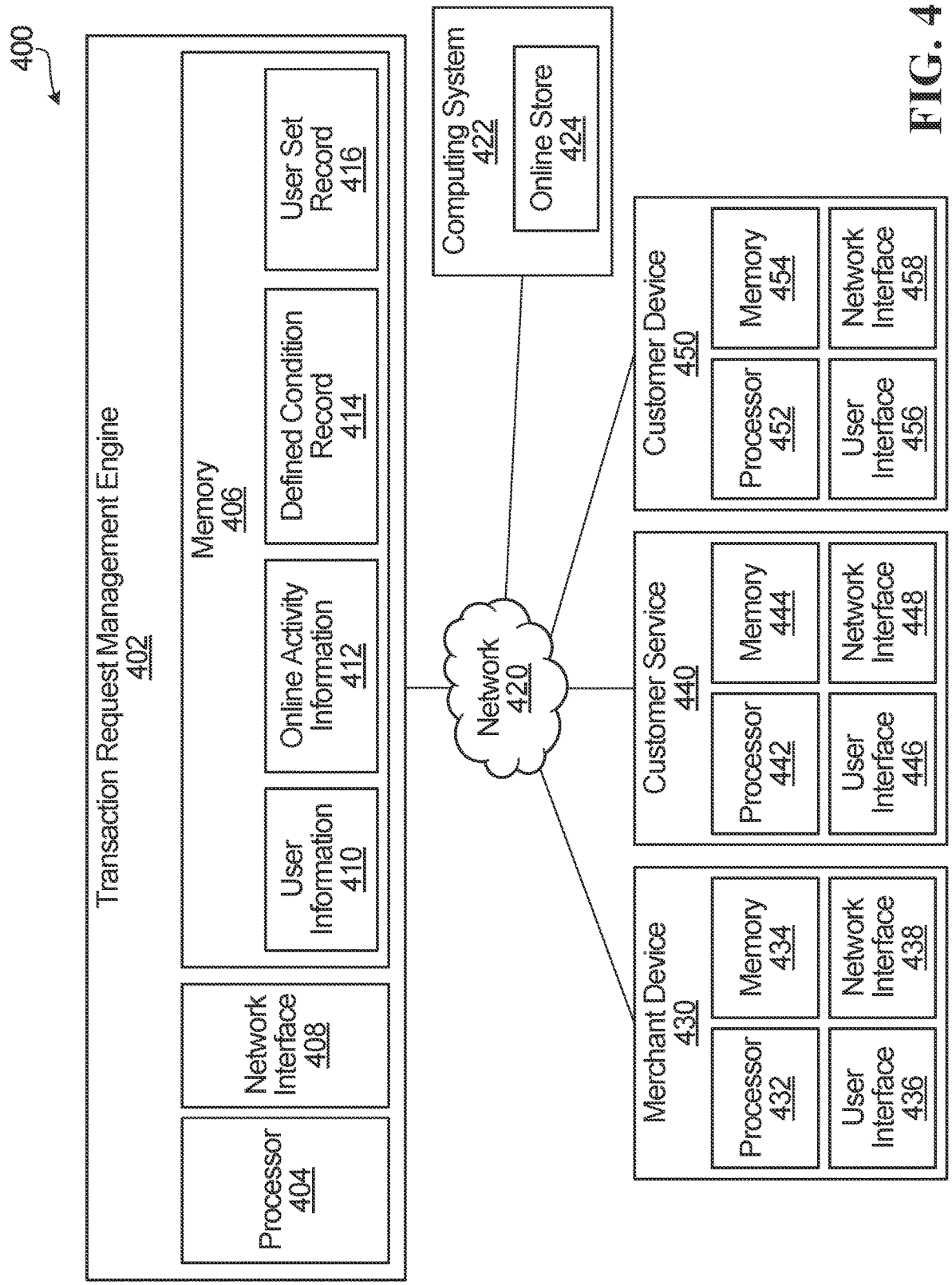
FIG. 4 is a block diagram illustrating a system for creating, processing and managing transaction requests, according to an embodiment.

FIG. 4 is a block diagram illustrating an example system 400 for creating, processing and managing transaction requests. The system 400 includes a transaction request management engine 402, a network 420, a computing system 422, a merchant device 430 and multiple customer devices 440, 450.

The computing system 422 supports, hosts or otherwise implements an online store 424. The computing system 422 may receive and/or process one or more transaction requests for the online store 424. Examples of such transaction requests include, inter alia, orders for products sold through the online store 424. The structure of the computing system 422 is implementation specific. The computing system 422 may include or implement a processor, memory, server, client, network interface, network infrastructure, mobile computing platform, cloud computing platform and/or stationary computing platform, for example. Optionally, the computing system 422 is part of an e-commerce platform. For example, the computing system 422 may be similar to the e-commerce platform 100, and the online store 424 may be similar to the online store 138.

In some implementations, the online store 424 is owned and/or operated by a merchant associated with the merchant device 430. For example, the merchant device 430 may be used to manage the online store 424. The merchant device 430 may be a mobile phone, tablet, laptop or computer.

Either or both of the customer devices 440, 450 may be a mobile phone, tablet, laptop or computer owned and/or used by respective customers. These customers may be previous, current and/or potential customers of the online store 424. For example, using the customer device 440, the corresponding customer may visit the online store 424. Optionally, this customer may be signed-on to an account with the online store 424.

As illustrated, the merchant device 430 includes a processor 432, memory 434, user interface 436 and network interface 438. The customer device 440 also includes a processor 442, memory 444, user interface 446 and network interface 448. Further, the customer device 450 includes a processor 452, memory 454, user interface 456 and network interface 458. The merchant device 430 will be described by way of example below. However, it should be noted that either or both of the customer devices 440, 450 may be implemented in the same or a similar way.

An example of the user interface 436 is a display screen (which may be a touch screen), a gesture recognition system, a keyboard, and/or a mouse. The network interface 438 is provided for communicating over the network 420. The structure of the network interface 438 will depend on how the merchant device 430 interfaces with the network 420. For example, if the merchant device 430 is a mobile phone or tablet, then the network interface 438 may include a transmitter/receiver with an antenna to send and receive wireless transmissions to/from the network 420. If the merchant device 430 is a personal computer connected to the network with a network cable, then the network interface 438 may include, for example, a network interface card (NIC), a computer port (for example, a physical outlet to which a plug or cable connects), and/or a network socket. The processor 432 directly performs or instructs all of the operations performed by the merchant device 430. Examples of these operations include processing user inputs received from the user interface 436, preparing information for transmission over the network 420, processing data received over the network 420, and instructing a display screen to display information. The processor 432 may be implemented by one or more processors that execute instructions stored in the memory 434. Alternatively, some or all of the processor 432 may be implemented using dedicated circuitry, such as an application specific integrated circuit (ASIC), a graphics processing unit (GPU) or a programmed field programmable gate array (FPGA).

In FIG. 4, the number of merchant and customer devices are shown by way of example. Any number of merchant devices and customer devices may be implemented in the system 400. In addition, any number of online stores may be implemented in the system 400.

The network 420 may be a computer network implementing wired and/or wireless connections between different devices, including any two or more of the transaction request management engine 402, the computing system 422, the merchant device 430 and the customer devices 440, 450, for example. The network 420 may implement any communication protocol known in the art. Non-limiting examples of communication protocols include a local area network (LAN), a wireless LAN, an internet protocol (IP) network, and a cellular network.

The transaction request management engine 402 is configured to manage transaction requests, including but not limited to transaction requests received and/or processed by the computing system 422 for the online store 424. The transaction request management engine 402 includes a processor 404, memory 406 and a network interface 408. The processor 404 may be implemented by one or more processors that execute instructions stored in the memory 406 or in another non-transitory computer readable medium. These instructions could implement any method described herein. Alternatively, some or all of the processor 404 may be implemented using dedicated circuitry, such as an ASIC, a GPU, or a programmed FPGA.

The network interface 408 is provided for communication over the network 420. The structure of the network interface 408 is implementation specific. For example, the network interface 408 may include a NIC, a computer port, and/or a network socket.

As illustrated, the memory 406 stores user information 410, online activity information 412, a defined condition record 414 and a user set record 416.

The user information 410 includes data pertaining to one or more users. Any, one, some or all of these users might be customers of the online store 424. For example, some users may have an account on the online store 424 and/or have previously placed an order through the online store 424. However, the user information 410 is not limited to customers of the online store 424. The user information 410 may also or instead pertain to customers of other online stores or, more generally, to users of other computing systems such as social media platforms, for example.

For a given user, the following is a non-limiting list of different types of information that may be included in the user information 410.

An identity of the user, such as the user's name, username, moniker and/or identification number, for example.

One or more locations associated with the user, which may provide an indication of where the user resides. These locations may include one or more known addresses for the user such as a home address, a work address, a shipping address and/or a billing address, for example. The locations may also or instead include, or be based on, location data. Location data may include satellite data, such as global positioning system (GPS) coordinates, for example. Further, the location data may include one or more IP addresses obtained from a device (or devices) associated with the user.

A purchase history for the user, such as a list of products that the user has purchased online and/or through physical retail stores and their associated dates, for example. The purchase history may also or instead include a value of the products purchased by the user. In some cases, the purchase history for the user is organized by a merchant and/or by an online store.

An assessment of automated activity for the user. For example, if any devices and/or accounts associated with the user demonstrate activity that is correlated with automated functionality, then the user might be considered a "bot". An assessment of automated activity may include an assessment of the speed, repetitiveness and/or response time exhibited by the user in the computing system 422 and/or in other computing systems.

Any social media accounts associated with the user and, optionally, a record of their activity on those accounts.

A record of any resale activity associated with the user. This may include situations in which the user has purchased an exclusive product during a flash sale, for example, and then resold the product via a resale marketplace.

An assessment of the user's identity to determine if their identity is fraudulent. For example, this assessment may determine if the user is using a stolen credit card.

A record of the products that the user has expressed interested in.

In some implementations, the user information 410 may include one or more labels or "tags" assigned to different users. A label may be assigned to a user when the user meets a condition based on any, one, some or all of the different types of information outlined above. Non-limiting examples of different labels include:

a label indicating that a user resides in a particular region;
a label indicating that a user has purchased a particular product within a particular time frame;
a label indicating that a user has not purchased an exclusive product from a particular merchant before;
a label indicating that a user has shopped with a particular merchant before;
a label indicating that a user has spent at least a particular amount of money in an online store;
a label indicating that a user has demonstrated bot-like activity;
a label indicating that a user has engaged in the resale of exclusive products; and
a label indicating that a user's identity has been confirmed.

Labels may be defined by, configured by, or otherwise specific to a merchant. A merchant-specific label may allow the corresponding merchant to segregate their customer base in a flexible and configurable manner. In some sense, a merchant-specific label may indicate the "state" of a user from the perspective of the merchant.

The user information 410 may be obtained in any of a number of different ways. In some implementations, at least some of the user information 410 is obtained from a merchant device and/or from an online store, including but not limited to the merchant device 430 and the online store 424. For example, information pertaining to customers of the online store 424 may be recorded in a database at the computing system 422 and transmitted to the transaction request management engine 402. Alternatively, or additionally, at least some of the user information 410 may be obtained from an external source, such as a repository of customer information made available by particular customers (for example, via a shopping application installed on one or both of the customer devices 440, 450) or by one or more social media platforms (for example, via a database storing user information for the users of a social media platform).

The online activity information 412 provides a record of online activity that is monitored by the transaction request management engine 402. Non-limiting examples of such online activity include a user accessing a web resource (such as a webpage or a screen page, for example) and/or sending messages (such as instructions or requests, for example). The online activity information 412 may pertain to multiple users, including any, one, some or all of the users identified in the user information 410. In some implementations, the user information 410 includes, or is at least partially based on, the online activity information 412.

The online activity information 412 may be used to help manage transactions requests. For example, at least some of the online activity information 412 may anticipate, predict or otherwise indicate that a particular transaction request might be sent to the computing system 422 or to another computing system by one or more users. The online activity of these users may demonstrate an interest in this transaction request, and therefore the users may be considered candidates for creating the transaction request. In some implementations, the transaction request management engine 402 uses the online activity information 412 to determine the users that are considered candidates for creating a particular transaction request, which may help reduce the total number of users that are considered when managing the transaction request.

The defined condition record 414 includes one or more conditions for transaction requests implemented by the computing system 422 and/or by other computing systems. In some implementations, these conditions may be used to select a set of users that are permitted to create a particular transaction request. Users that meet one or more of the conditions may be included in the set of users, whereas users that fail to meet one or more conditions may be excluded from the set of users. In this way, the total number of users that are permitted to send the particular transaction request to a computing system may be reduced.

Conditions may be organized in terms of the transaction request that they pertain to in the defined condition record 414. For example, the defined condition record 414 may include multiple lists of one or more conditions, where each list relates to a different transaction request.

In the case that a particular transaction request relates to the sale of a product, conditions may be defined by, or otherwise provided by, a merchant that is selling the product. For example, user input at the merchant device 430 may define conditions for a transaction request that are sent to the transaction request management engine 402 for storage in the defined condition record 414. A supplier of a product may also or instead provide conditions for a transaction request related to the sale of the product. For example, the supplier may define conditions to prevent a merchant from unfairly selling an exclusive product to customers that the merchant knows. Supplier-defined conditions may be provided to the transaction request management engine 402 directly from the supplier, or via a merchant.

Non-limiting examples of defined conditions for a particular transaction request that may be included in the defined condition record 414 are provided below.

A set of one or more regions. This condition may prevent users located outside of these regions from submitting the transaction request. In contrast, users located inside of these regions may be permitted to submit the transaction request. The location of a user may be determined based on a known address of the user and/or on location data, for example. Alternatively, such a condition may be employed to exclude users located inside particular regions from submitting the transaction request.

A predetermined financial commitment. For example, this condition may require a user to place a deposit for a product sold via the transaction request. This condition may also or instead require that a user donates to a charity in order to submit the transaction request.

A predetermined previous purchase history. For example, if the transaction request is an order for a product sold by a merchant, then this condition might require users to have previously purchased a certain number of products from the merchant and/or have spent a certain amount of money with the merchant, optionally over a fixed time frame.

Restrictions for resellers. For example, any user that is a known or suspected reseller of products may be restricted from submitting the transaction request.

Restrictions for users demonstrating automated activity. For example, a user that is associated with previous bot-like behaviour may be restricted from submitting the transaction request, as bot-like behaviour may be indicative of a reseller rather than a genuine customer.

Previous instances of submitting the transaction request. For example, if a user has previously sent a transaction request to purchase a product, then the user might be restricted from sending the transaction request again.

Previous instances of submitting a different transaction request. For example, if a user has previously sent a transaction request to purchase a different exclusive product, then the user might be restricted from purchasing another exclusive product.

Age restrictions. For example, users under the age of 18 or 21 might not be eligible to purchase certain products.

Restrictions for users associated with fraudulent identities. This may include restrictions for users that are associated with stolen credit cards, for example.

The user set record 416 includes one or more sets of users that are defined to manage transaction requests. Each set of users may correspond to a different transaction request. A set of users may include an identifier of each user in the set, such as a name, identification number, contact information (for example, a phone number or email address), and/or address of a user, for example. In some implementations, the identifier of each user is hashed or otherwise masked in the user set record 416 to help maintain user privacy.

As discussed in further detail elsewhere herein, a set of users may be selected based on conditions stored in the defined condition record 414 and may be implemented to help prevent origination of transaction requests on behalf of users that do not meet those conditions. This may reduce the number of transaction requests that are received and/or processed by a computing system.

While the user information 410, online activity information 412, defined condition record 414 and user set record 416 are shown separately in FIG. 4, this is only an example. Two or more of these records may instead be combined. For example, the user information 410 and the user set record 416 may be combined by assigning a label to each user that is included in a set of users for a transaction request, and storing these labels with the user information 410.

As illustrated in FIG. 4, the transaction request management engine 402 and the computing system 422 are separate. Separating the computing system 422 from the transaction request management engine 402 may conserve resources at the computing system 422. However, in some implementations, the transaction request management engine 402 and the computing system 422 may be at least partially combined. For example, the computing system 422 may implement the transaction request management engine 402 and the online store 424.

Other implementations of a transaction request management engine are also contemplated. In some implementations, a transaction request management engine is provided at least in part by an e-commerce platform, either as a core function of the e-commerce platform or as an application or service supported by or communicating with the e-commerce platform. In some implementations, a transaction request management engine is implemented at least in part by a user device, such as a merchant device, for example. In some implementations, a transaction request management engine is implemented as a stand-alone service to manage transaction requests. In some implementations, a transaction request management engine may be implemented to manage transaction requests as a part of a service that is part of a system/platform other than/separate from an e-commerce platform. While the transaction request management engine 402 is shown as a single component, a transaction request management engine could instead be provided by multiple different components that are in communication via a network.

Figure 5:
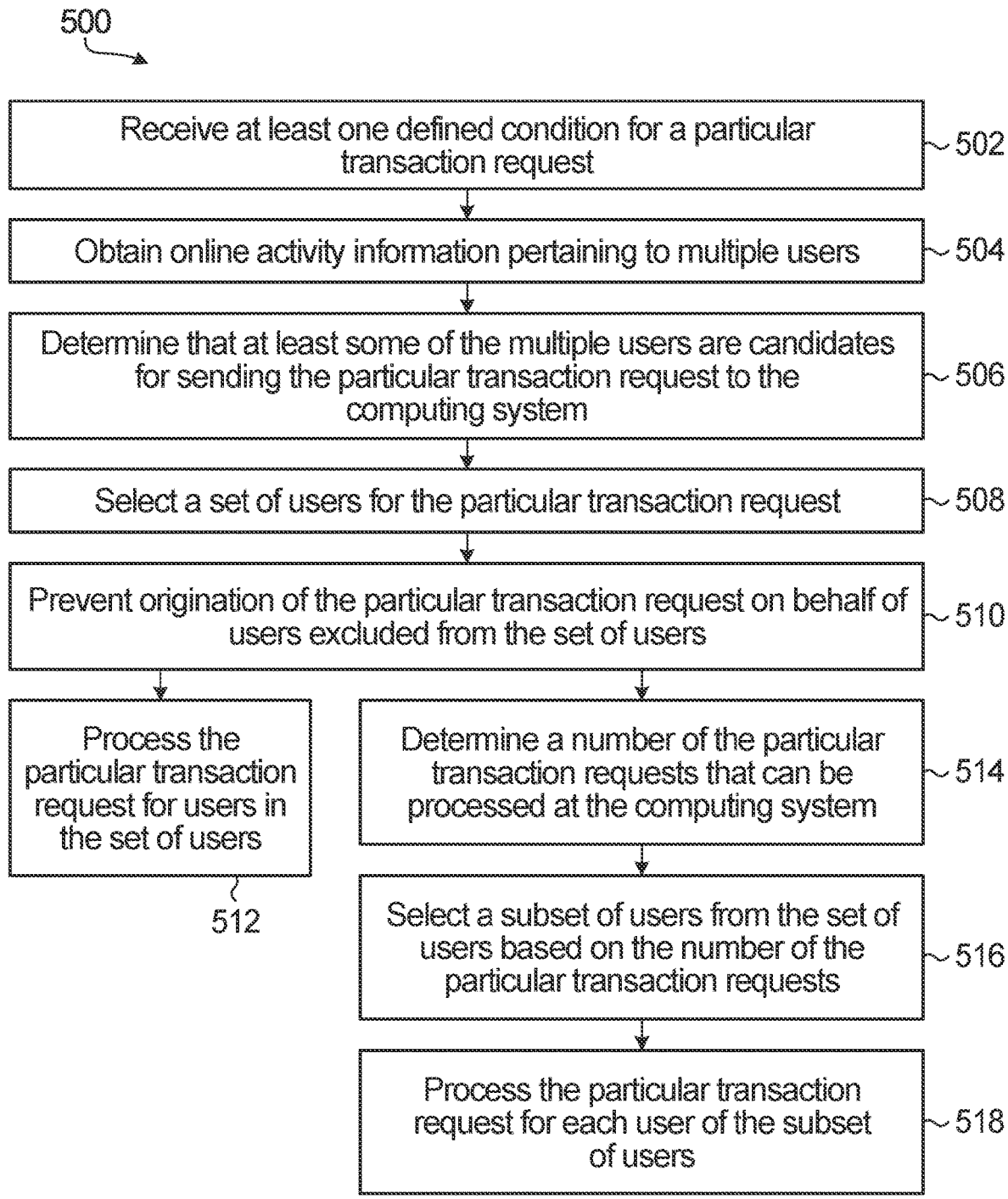
FIG. 5 is a flow diagram illustrating a method for managing a particular transaction request, according to an embodiment.

FIG. 5 is a flow diagram illustrating a method 500 for managing a particular transaction request, according to an embodiment. The method 500 will be described as being performed by the transaction request management engine 402 of FIG. 4, where the particular transaction request is associated with the online store 424. For example, the particular transaction request may be an order for a product sold in the online store 424. In some implementations, the memory 406 may store instructions which, when executed by the processor 404, cause the processor 404 to perform the method 500.

Other implementations of the method 500 are also contemplated. For example, the particular transaction request could be associated with another computing system and/or another online store. The method 500 is also not limited to a transaction request management engine and may be performed in whole or in part by a merchant device and/or an e-commerce platform, for example. Further, the method 500 may be implemented in applications outside of commerce. For example, the method 500 may be performed in association with a financial platform and/or a social media platform.

Step 502 includes the processor 404 receiving at least one defined condition for the particular transaction request. The at least one defined condition may be provided to reduce the number of users that are permitted to send the particular transaction request to the computing system 422. Examples of defined conditions for a transaction request are provided elsewhere herein.

The processor 404 may receive the at least one defined condition from a device that is associated with the particular transaction request, which may be the merchant device 430 in some implementations. For example, the merchant device 430 may be owned by a merchant of the online store 424 and used to manage the online store 424. The merchant may generate the at least one defined condition through input at the user interface 436, which is then transmitted to the transaction request management engine 402 and stored in the defined condition record 414. In some implementations, the device associated with the particular transaction request is a device associated with a supplier of a product that is sold via the particular transaction request. The supplier may provide the at least one defined condition to regulate sales of their product via the online store 424, for example.

In the case that multiple defined conditions for the particular transaction request are received in step 502, these multiple defined conditions may be received at once or at multiple different times. Further, multiple merchants and/or multiple devices may be involved in generating and transmitting the multiple defined conditions.

Step 502 might not be performed in some implementations of the method 500. For example, at least one defined condition for the particular transaction request may have been pre-generated and stored in the defined condition record 414 before the method 500 is performed. Thus, step 502 is optional.

Step 504 includes the processor 404 obtaining online activity information pertaining to multiple users. This online activity information may be, or may be part of, the online activity information 412. The multiple users that the online activity information pertains to may include customers of the online store 424 and/or customers of other online stores. Further, the multiple users may include users of other computing systems, such as social media platforms.

Step 506 includes the processor 404 determining that at least some of the multiple users are candidates for sending the particular transaction request to the computing system 422. Step 506 may be based on the online activity information obtained in step 504. For example, the processor 404 may parse the online activity information to determine which customers are candidates for sending the particular transaction request and which are not. Step 506 might include searching the online activity information for records of certain online activities that are associated with the particular transaction request.

By way of example, using the customer devices 440, 450, the corresponding customers may have accessed web resources and/or sent messages that indicate their intention to send the particular transaction request to the online store 424. These actions may be recorded in online activity information pertaining to the customers of the customer devices 440, 450, which is obtained in step 504. In step 506, using this online activity information, the processor 404 may determine that each of the customers of the customer devices 440, 450 is a candidate for sending the particular transaction request to computing system 422.

The following are non-limiting examples of online activities that may be recorded in the online activity information obtained in step 504. Each of these examples may provide an indication that the user is a candidate for sending the particular transaction request to the computing system 422.

A record of the user accessing web resources provided by the online store 424 using a user device. For example, the record may indicate that one or more webpages of the online store 424 were generated for presentation on the user device via a web browser or a mobile application.

A record of the user previously purchasing a product via the online store 424.

A record of the user generating a raffle entry that is associated with the particular transaction request. For example, the particular transaction request might be an order for an exclusive product sold through a flash sale, and the online store 424 could implement a raffle to help determine the customers that are sold the exclusive product. The user's raffle entry may provide an indication that the user intends to purchase the exclusive product during the flash sale. If the user's entry is selected during the raffle, then the user might be permitted to submit the particular transaction request for the exclusive product during the flash sale.

Step 508 includes the processor 404 selecting a set of users for the particular transaction request. In some implementations, this set of users defines the users that are eligible to send the particular transaction request to the computing system 422 and the users that are not eligible to send the particular transaction request to the computing system 422. Following step 508, the selected set of users may be stored in the user set record 416.

In some implementations, the set of users is selected from the users identified in step 506 as being candidates for sending the particular transaction request to the computing system 422. Some of these candidate users may be included in the selected set of users, while other candidate users may be excluded from the set. For example, the customer of the customer device 440 may be included in the set and the customer of the customer device 450 may be excluded from the set. Users that are not identified as candidates for sending the particular transaction request to the computing system 422 might also be excluded from the set of users.

Identifying the candidate users in step 506 may help reduce the number of users that are considered in step 508. For example, selecting the set of users from every user that is known to the online store 424 and/or to the transaction request management engine 402 might be unnecessarily onerous and computationally demanding for the transaction management engine 402. However, step 508 might not be based on users that are identified as candidates in some implementations. For example, a merchant may wish to select the set of users from another group or from every user that is known to the online store 424 and/or to the transaction management engine 402. Thus, steps 504, 506 are optional.

Step 508 may be performed based on at least one defined condition for the particular transaction request. The at least one defined condition may have been received in step 502 and/or may have been obtained from the defined condition record 414, for example. In the case that step 508 is based on only one defined condition, then the users that meet the defined condition may be included in the set of users, while users that do not meet the defined condition might be excluded from the set. Alternatively, in the case that step 508 is based on multiple defined conditions, then a user may be required to meet a minimum number (for example, one or more, two or more, etc.) of the defined conditions to be included in the set of users.

In some implementations, multiple defined conditions might include mandatory conditions and optional conditions. A user might have to meet each mandatory condition and a certain number of optional conditions in order to be included in the set of users. By way of example, consider a case in which step 508 is based on the following defined conditions:

1) a restriction for resellers;
2) a restriction for users demonstrating bot-like activity;
3) a minimum previous purchase history with the merchant; and
4) a minimum financial commitment.

Conditions 1) and 2) may be defined as mandatory, whereas conditions 3) and 4) may be defined as optional. To be included in a set of users, a user might have to meet both of the mandatory conditions and meet at least one of the optional conditions.

In some implementations, one or more conditions may depend from another condition. For example, a first condition specifying a minimum previous purchase history may depend from a second condition that restricts resellers. If a customer is a known reseller and therefore does not meet the second condition, then the first condition may specify a minimum previous purchase history in the past 60 days to be $200 or more. Alternatively, if a customer is not a known reseller and therefore does meet the second condition, then the first condition may specify a minimum previous purchase history in past 60 days might be $20 or more.

Step 508 may be performed based on user information. This user information may be, or may be part of, the user information 410. Further, the user information may include, or may be based on, the online activity information obtained in step 504. For example, a raffle entry may include user information used in step 508.

The user information may help determine whether a user meets at least one defined condition. For example, step 508 may include comparing the at least one defined condition to the user information. In some implementations, the user information includes labels assigned to the users. These labels may be assigned to users by the merchant of the online store 424. However, other users and/or systems may also or instead assign the labels. During step 508, the processor 404 may select the set of users based on the labels assigned to users. For example, one or more labels may indicate whether or not a user meets a certain defined condition.

Step 510 includes preventing origination of the particular transaction request on behalf of users excluded from the set of users selected in step 508. Origination of the particular transaction request may include, for example, the creation or generation of the particular transaction request at a user device, and/or the submission or transmission of the particular transaction request to the computing system 422. Preventing origination of the particular transaction request in step 510 may reduce the number of times that the computing system 422 receives and/or processes the particular transaction request, and therefore might conserve resources at the computing system 422.

If a user is included in the set of users, then origination of the particular transaction request on behalf of this user may be permitted by the transaction request management engine 402. Step 512 is an optional step that includes the computing system 422 processing the particular transaction request for any, one, some or all of the users that are included in the set of users. In some cases, a user in the set or users might be allowed to send a particular transaction request but that transaction request may subsequently not be completed by the computing system 422 due to one or more other users in the set sending their own transaction requests more quickly, and therefore the computing system 422 processing and completing the other user's transaction request prior to the first user's. In these cases, an inventory of a product may be depleted before the first user's transaction request is completed.

Step 510 may be implemented in any of a number of different ways. In some implementations, step 510 includes generating an instruction to render a web resource for a user excluded from the set of users. This web resource excludes an option to send the particular transaction request to the computing system 422, which may have otherwise been present in the web resource if the user was included in the set of users. The user is therefore denied the opportunity to create, generate, submit and/or transmit the particular transaction request. If the particular transaction request corresponds to an order for a product in the online store 424, then the web resource might not include an option to purchase the product. As such, step 510 denies the user the option to purchase the product from the online store 424. In contrast, a corresponding web resource that is generated for a user included in the set of users may include an option to send the particular transaction request to the computing system 422 to purchase the product.

By way of example, consider a case in which a first customer of the customer device 440 is included in the set of users and a second customer of the customer device 450 is excluded from the set of users. Here, the particular transaction request corresponds to an order for a product sold through a product page of the online store 424. This product page is an example of a web resource. When the first customer uses the customer device 440 to request the product page of the online store 424, an instruction may be generated to render a first version of the product page at the customer device 440. The first customer may be identified by the transaction request management engine 402 and/or the computing system 422 when they sign in to their account with the online store 424 using the customer device 440, for example. Alternatively or additionally, location data and/or browser cookies obtained from the customer device 440 may be used to identify the first user. The first version of the product page may include an option to send the particular transaction request to the computing system 422, which could be in the form of a buy-button, for example. In this way, the first customer is permitted to purchase the product.

On the other hand, when the second customer uses the customer device 450 to request the product page of the online store 424, an instruction may be generated to render a second version of the product page at the customer device 450. The second customer may be identified based on their account with the online store 424, location data and/or browser cookies. The second version of the product page excludes the option to send the particular transaction request to the computing system 422. For example, the buy-button presented in the first version of the product page might not be included in the second version, or the button may be disabled or otherwise not selectable in the second version. In this way, the second customer is denied the option to purchase the product.

Step 510 may be performed by the transaction request management engine 402 and/or by the computing system 422. In some implementations, the processor 404 of the transaction request management engine 402 generates the instruction to render the web resource for a user excluded from the set of users in step 510. The instruction may then be transmitted to the computing system 422, where the web resource is generated and transmitted to a user device associated with the user. Alternatively, the instruction may be transmitted directly from the transaction request management engine 402 to the user device and the web resource may be generated locally at that user device.

In other implementations, the computing system 422 generates the instruction to render the web resource for a user excluded from the set of users. For example, step 510 may include the processor 404 transmitting a record of the set of users to the computing system 422. This informs the computing system 422 as to the set of users and may allow the computing system 422 to prevent origination of the particular transaction request on behalf of users excluded from the set of users. The computing system 422 may then generate the instruction to render the web resource for a user excluded from the set of users, where the web resource excludes an option to send the particular transaction request. In this way, at least a portion of step 510 may be performed at the computing system 422.

In some implementations, labels may be used to indicate which users are included in the set of users and which users are excluded from the set of users. For example, each user in the set of users may be assigned a label that is indicative of each user's inclusion in the set. The labels may be stored in the user information 410 and/or may be transmitted to the computing system 422. Labels could help the transaction request management engine 402, the computing system 422 and/or other computing systems track the users in the set of users and prevent origination of the particular transaction request on behalf of users excluded from the set of users. For example, the computing system 422 may interpret the lack of a label for a user as an instruction to prevent origination of the particular transaction request on behalf of the user.

In some implementations, there might only be a limited number of transactions requests that can be completed by the computing system 422. This might be the case for a flash sale, for example. Flash sales typically have a limited number of available items of a product, and therefore the computing system 422 can only complete a number of transaction requests for the product that is equal to the number of items available. In these implementations, the method 500 may perform optional steps 514, 516, 518.

Step 514 includes the processor 404 determining a number of the particular transaction requests that can be completed at the computing system 422. This number may be specified by the merchant via the merchant device 430 and transmitted to the transaction request management engine 402. The number may correspond to the number of items of the product that the merchant has in stock, for example.

Step 516 includes the processor 404 selecting a subset of users from the set of users selected in step 508, based on the number of the particular transaction requests determined in step 514. The number of users in the subset may equal the number of the particular transaction requests determined in step 514. The selection of the subset may be random (for example, through a raffle) and/or may be based on defined conditions for the particular transaction request. For example, each user in the set of users may be ranked based on how many defined conditions they meet and/or how well they meet the defined conditions. The subset of users may be selected based on that ranking. In some cases, the users at the top of the ranking may be selected for the subset. In other cases, the ranking may be used to weigh the probability of each user being selected for the subset in a weighted, semi-random selection process. A record of the subset of users may be transmitted from the transaction request management engine 402 to the computing system 422 and stored in the user set record 416, for example. A record of the subset of users may also or instead be transmitted to any other computing system or device.

In step 518, the computing system 422 processes and completes the particular transaction request for each user of the subset of users. For example, when the particular transaction request is sent by a user device associated with a user included in the subset, then the computing system 422 may process and complete the particular transaction request. In some cases, a user in the subset might only have a limited amount of time to submit the particular transaction request (for example, to place an order during the flash sale), before the user is removed from the subset and a different user from the set is added to the subset.

In some implementations, the transaction request management engine 402 and/or the computing system 422 may prevent origination of the particular transaction request on behalf of a user excluded from the subset of users. This may be similar to preventing origination of the particular transaction request on behalf of a user excluded from the set of users in step 510, for example.

It should be noted that the order of steps 502, 504, 506, 508, 510, 512, 514, 516, 518 is shown by way of example in FIG. 5. Other orders of steps 502, 504, 506, 508, 510, 512, 514, 516, 518 are also contemplated. In one example, steps 514, 516 may be performed before step 510 and/or in parallel with step 510. In another example, steps 510, 512, 518 may be performed in any order and/or in parallel.

The method 500 provides an example of reducing the number of transaction requests processed by a computing system by preventing origination of the transaction requests on behalf of some users. Other methods for reducing the number of transaction requests processed by a computing system are also contemplated. In some embodiments, step 510 of the method 500 may be replaced with an alternative step of providing, by the processor 404, an instruction to limit processing of the particular transaction request at the computing system 422 in relation to a user that is excluded from the set of users determined in step 508. The instruction may configure the computing system 422 not to enable, accept and/or process the particular transaction request from any users excluded from the set. This may include configuring the computing system 422 to prevent origination of the particular transaction request on behalf of users excluded from the set, but may also or instead include configuring the computing system 422 to limit processing of the particular transaction request in other ways. For example, if the particular transaction request does originate from a user excluded from the set and is received by the computing system 422, then the computing system 422 could immediately disregard the particular transaction request. Alternatively or additionally, the computing system 422 may implement delays to regulate a process of creating the particular transaction request for the user excluded from the set. For example, the computing system 422 could slow down a checkout process for creating the transaction request in the online store 424 through the use of challenges or tests for customers. Example manners of slowing down a checkout process are provided in U.S. patent application Ser. No. 16/802,744, filed on Feb. 27, 2020 and entitled "Systems and Methods to Regulate Sales of a Product in an Online Store", the contents of which are herein incorporated by reference in their entirety.

Further Examples of Managing Transaction Requests

FIGS. 6 to 12 illustrate examples of merchant and customer experiences pertaining to a flash sale for a product in an online store, according to an embodiment. During this flash sale, a transaction request in the form of an order for the product may be created by customers and sent to an e-commerce platform that supports the online store. These transaction requests may be managed to conserve resources at the e-commerce platform. For example, a transaction request management engine performing the method 500 may manage the transaction requests and at least partially provide the merchant and customer experiences shown in FIGS. 6 to 12.

Figure 6:
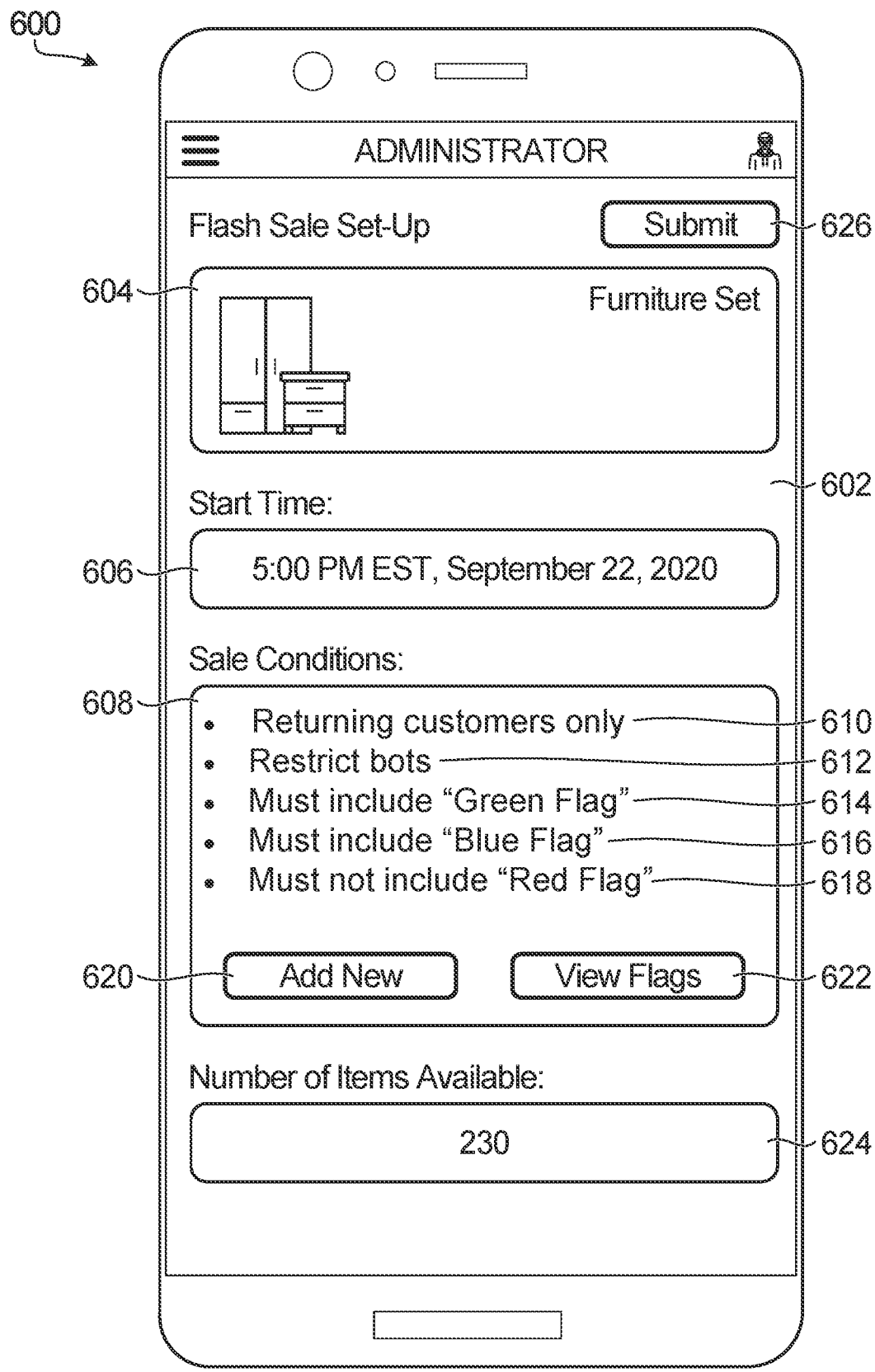
FIG. 6 illustrates a merchant device displaying a web resource of an administrator of an online store, according to an embodiment.

FIG. 6 illustrates a merchant device 600 displaying a web resource 602 (illustratively a webpage or a screen page) of an administrator of the online store. The merchant device 600 may be owned and operated by the merchant of the online store. The merchant may have logged onto their account with the e-commerce platform that supports the online store to access the administrator. In some implementations, this administrator is similar to the administrator 114 of FIG. 1. For example, the web resource 602 may have been accessed via a home page that is similar to the home page of the administrator 114 shown in FIG. 2.

The web resource 602 enables the merchant to configure or set-up the flash sale in the online store. The web resource 602 includes an indication 604 of the product being sold during the flash sale, which is a "Furniture Set" in the illustrated example. The web resource 602 also includes a box 606 for specifying a start time for the flash sale, which corresponds to the time at which the product goes on sale to eligible customers. The box 606 may be selectable via user input at the merchant device 600, allowing the merchant to dictate the start time of the flash sale.

The web resource 602 includes another box 608 listing multiple sale conditions 610, 612, 614, 616, 618 for the flash sale. These sale conditions 610, 612, 614, 616, 618 are examples of defined conditions for the associated transaction request, which may be obtained in step 502 of the method 500. In some implementations, the sale conditions 610, 612, 614, 616, 618 may have been specified or otherwise provided by the merchant of the online store and/or a supplier of the product. The box 608 includes an option 620 to define sale conditions for the flash sale. The option 620, and more generally any other options included in the web resources of FIGS. 6 to 12, may be buttons that are selectable via user input. Selection of the option 620 may provide a drop-down menu that includes multiple possible sale conditions for the merchant to choose from. Selection of the option 620 may also or instead provide a text box in which the merchant can define a sale condition using a script, for example.

As illustrated, the sale condition 610 requires that a customer be a previous or returning customer of the merchant in order to enter the flash sale. The sale condition 612 prevents customers that are believed to be bots from entering the flash sale. The sale conditions 614, 616, 618 are based on a "Green Flag", a "Blue Flag" and a "Red Flag", which are examples of labels that may be assigned to customers by the merchant and/or by the e-commerce platform. An option 622 to view and modify these labels is provided in the box 608. The "Green Flag", "Blue Flag" and "Red Flag" labels are described in further detail below.

The web resource 602 further includes a box 624 for defining the number of items of the product that are available for the flash sale. In some implementations, the box 624 may be a textbox that enables the merchant to specify the number of items via user input at the merchant device 600. The number of items of the product may equal the number of transaction requests for the product that are processable by the e-commerce platform during the flash sale, in order to prevent the e-commerce platform from selling more items of the product than are available. As such, the number of items specified in the box 624 may be used by the e-commerce platform in step 514 of the method 500 to determine the number of transaction requests that are processable.

An option 626 in the web resource 602 confirms the settings of the flash sale. Following selection of the option 626, the administrator may configure and implement the flash sale based on these settings.

In some implementations, a web resource similar to the web resource 602 may be provided to the supplier of the product sold through the flash sale, allowing the supplier to review and/or modify the configuration of the flash sale. This might include the supplier reviewing and/or modifying the sale conditions 610, 612, 614, 616, 618, for example.

Figure 7:
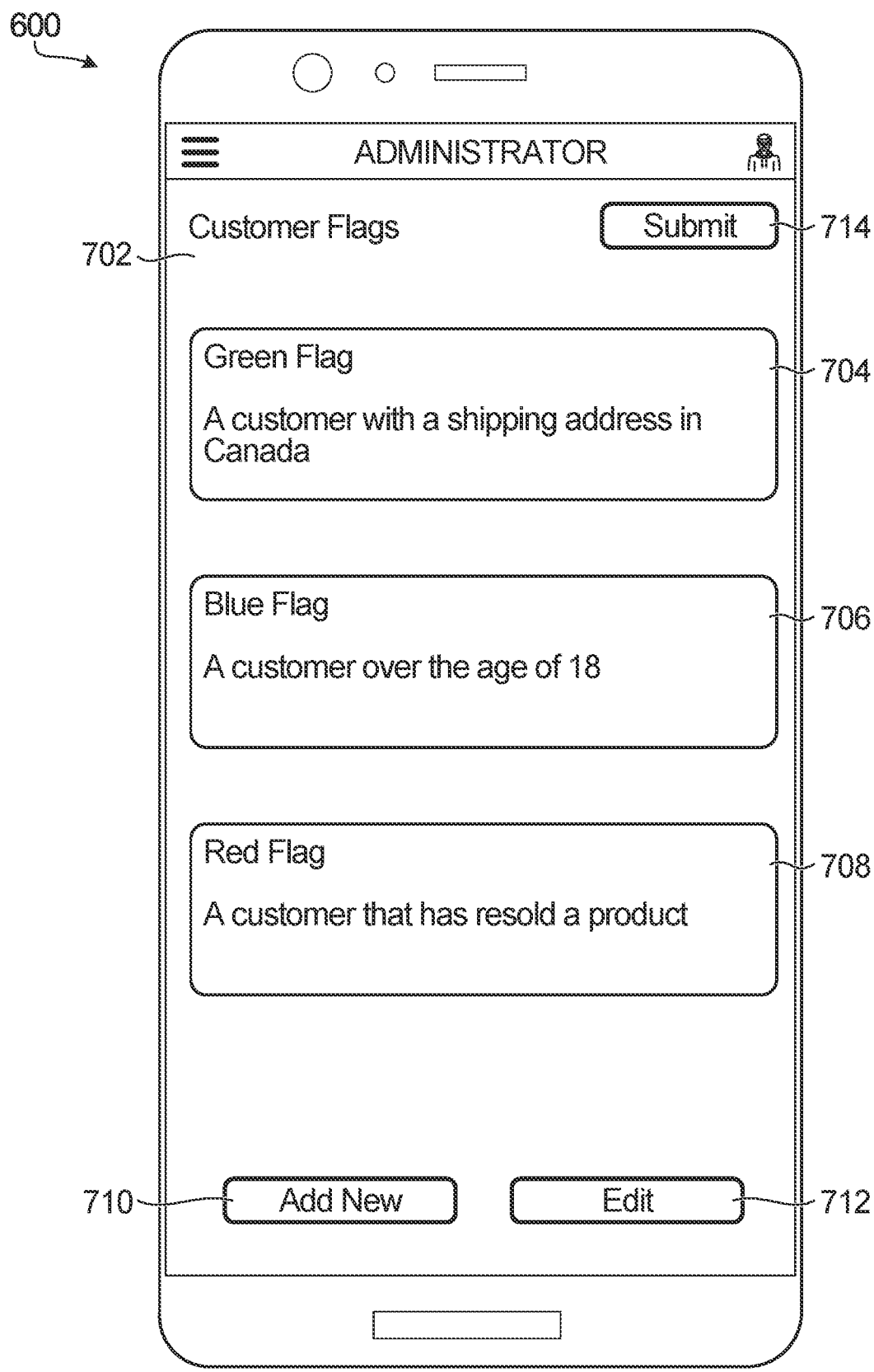
FIG. 7 illustrates the merchant device of FIG. 6 displaying another web resource of the administrator of the online store.

FIG. 7 illustrates the merchant device 600 displaying another web resource 702 of the administrator of the online store. The web resource 702 displays multiple labels 704, 706, 708 that the merchant may have previously defined or configured. The web resource 702 further includes an option 710 to configure a new label, an option 712 to edit an existing label and an option 714 to submit the labels. The web resource 702 may have been generated in response to selection of the option 622 in the web resource 602.

As illustrated, the labels 704, 706, 708 correspond to the "Green Flag", "Blue Flag" and "Red Flag" that are implemented in the sale conditions 614, 616, 618. In this way, FIGS. 6 and 7 provide an example of using previously defined labels to specify defined conditions for a transaction request.

In some implementations, selecting the option 710 allows the merchant to define a new label by providing a name for the label (for example, typing "Green Flag" into a textbox) and specifying the conditions that a customer must meet to be assigned the label. These conditions could be selected from a set of predefined conditions (via a dropdown menu, for example) and/or could be specified by the merchant (via a script, for example). Similar comments apply to editing a label following selection of the option 712.

Once a label is defined, the e-commerce platform may automatically assign that label to any of the merchant's customers that meet the associated conditions. For example, user information pertaining to any customer known to the merchant may be compared to the labels 704, 706, 708 to determine if that customer should be assigned one or more of the labels 704, 706, 708. Alternatively or additionally, a merchant may manually assign one or more of the labels 704, 706, 708 to users through a web resource of the administrator, for example. A record of a user being assigned one or more of the labels 704, 706, 708 may be stored by the e-commerce platform.

Figure 8:
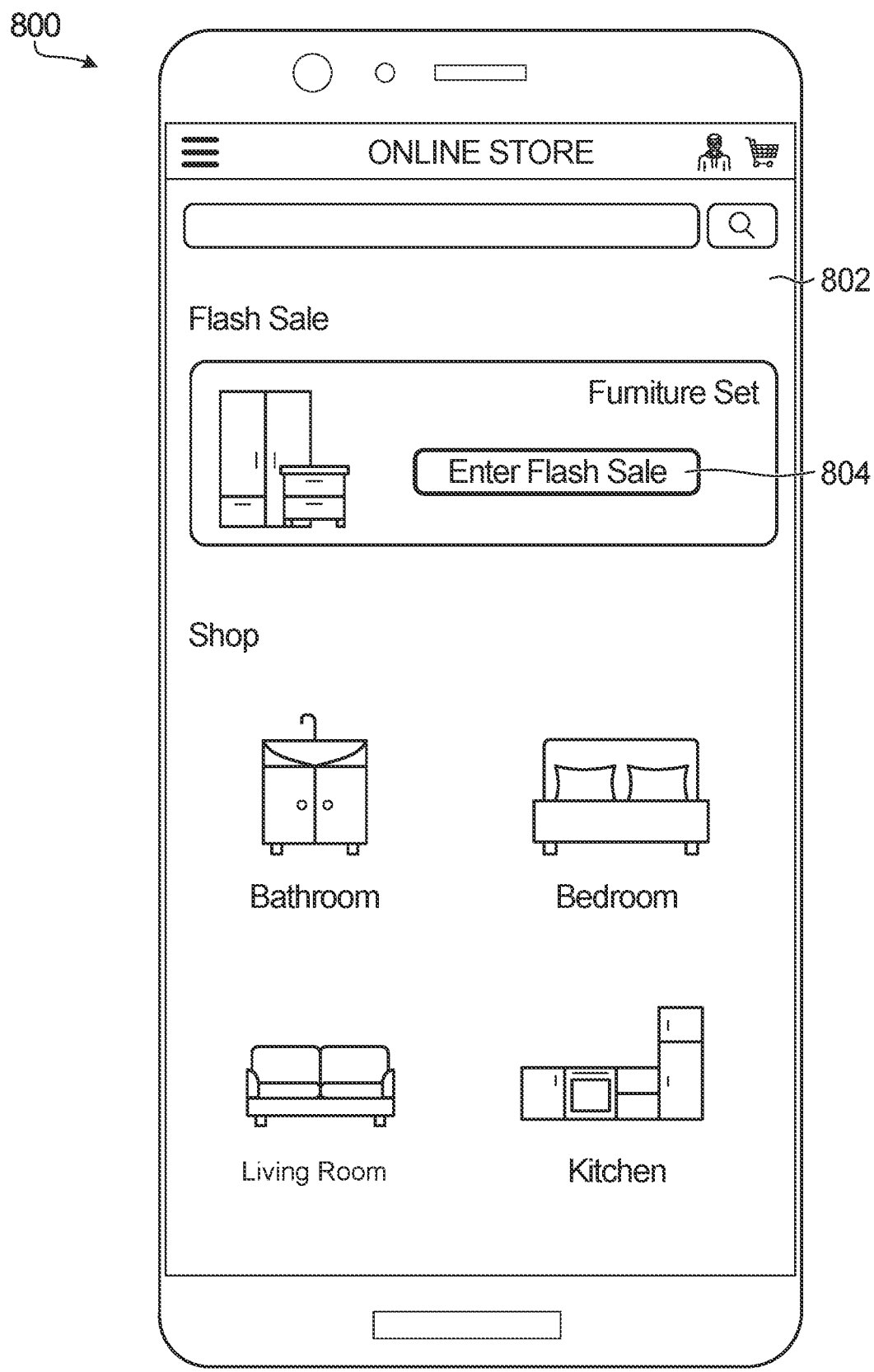
FIG. 8 illustrates a customer device displaying a web resource of the online store of FIG. 6.

FIG. 8 illustrates a customer device 800 displaying a web resource of the online store. The customer device 800 is associated with a first customer. For example, the first customer may have signed onto their account with the online store and/or with the e-commerce platform using the customer device 800. The web resource 802 corresponds to a homepage of the online store and includes multiple shopping options provided by the online store, including an option 804 to enter the flash sale.

Figure 9:
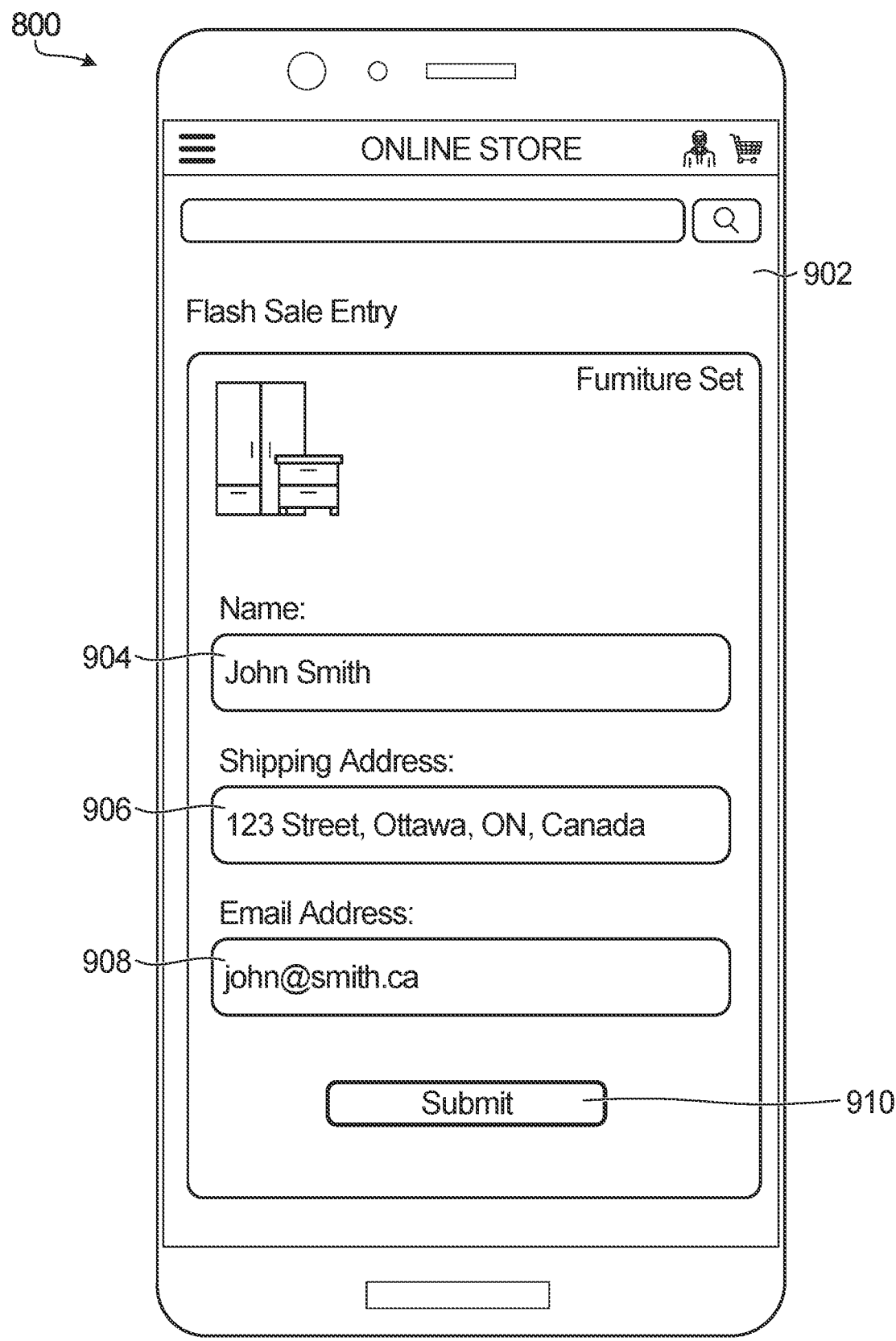
FIG. 9 illustrates the customer device of FIG. 8 displaying another web resource of the online store.

FIG. 9 illustrates the customer device 800 displaying another web resource 902 of the online store. The web resource 902 corresponds to a raffle entry for the flash sale and may be generated in response to selection of the option 804 in the web resource 802. The web resource 902 includes multiple boxes 904, 906, 908 in which the first customer may enter optional or required user information for the entry. This user information may allow the e-commerce platform to identify the first customer based on stored records and/or obtain further user information regarding the first customer. The web resource 902 further includes an option 910 to submit the entry to the e-commerce platform. Completing the boxes 904, 906, 908 and submitting the entry may be considered online activity indicating that the first customer intends to purchase the product during the flash sale. As such, the completed entry could be obtained in step 504 and analysed in step 506 of the method 500 to determine that the first customer is a candidate for sending an order for the product to the e-commerce platform.

Figure 10:
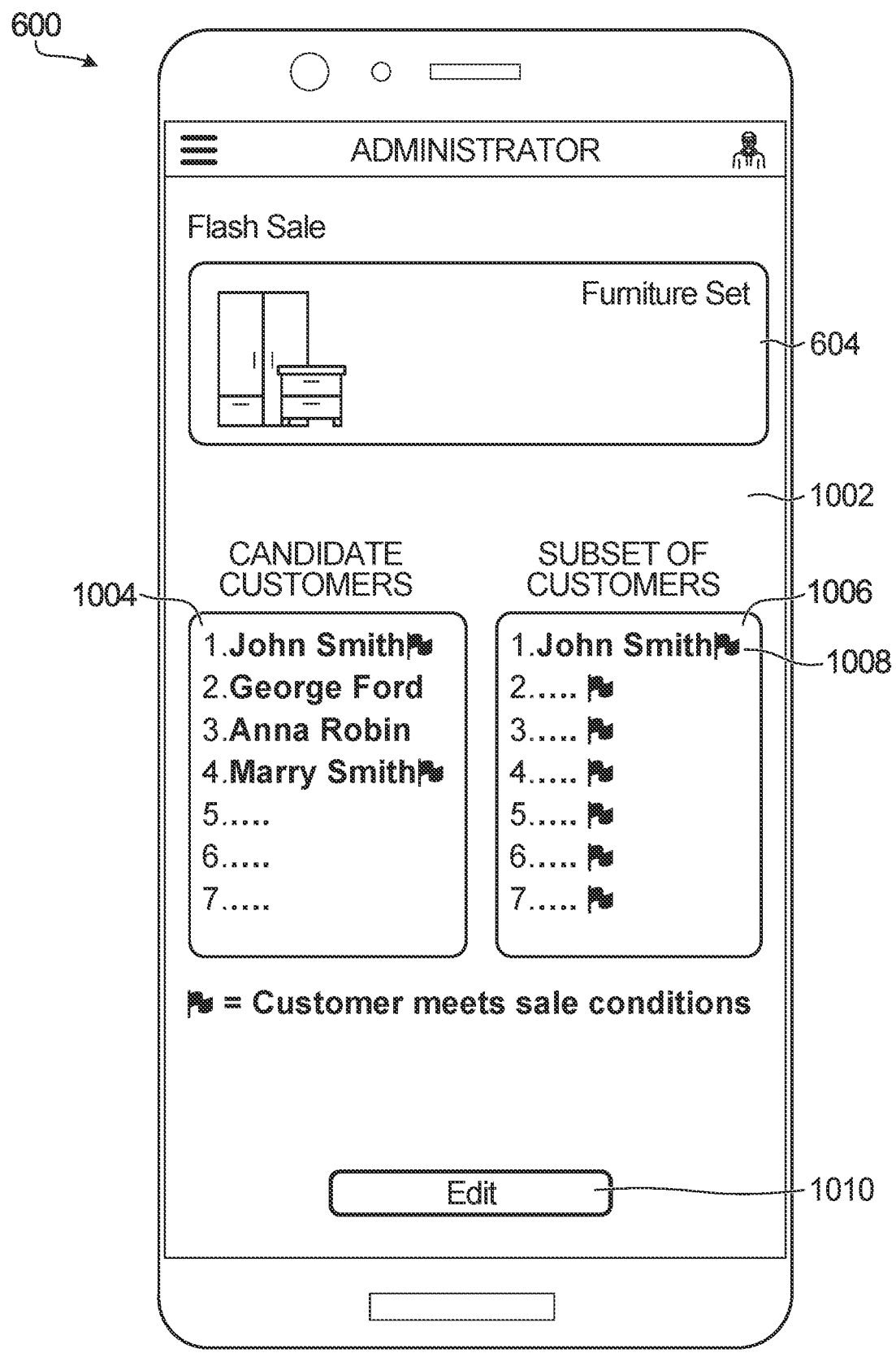
FIG. 10 illustrates the merchant device of FIG. 6 displaying yet another web resource of the administrator of the online store.

FIG. 10 illustrates the merchant device 600 displaying yet another web resource 1002 of the administrator of the online store. The web resource 1002 includes a record 1004 of the names of customers that are considered candidates for sending an order for the product to the e-commerce platform. For example, each of the customers in the record 1004 may have completed the raffle entry in the web resource 902. A set of customers for the flash sale has been selected from the record 1004 based on the sale conditions 610, 612, 614, 616, 618. The completion of the raffle entry in the web resource 902 may also be considered a sale condition that is met by each customer in the set of customers. The customers that are included in the set are identified in the web resource 1002 using a flag 1008 next to their name (only one flag 1008 is labelled in FIG. 10 to avoid congestion). The set of customers may have been selected in step 508 of the method 500, for example.

The web resource 1002 also includes a record 1006 of names of customers that are included in a subset of customers. The selection of the subset may have been based on the number of items of the product that are available (as shown in the box 624 in the web resource 602). In other words, the number of customers in the subset of customers may equal the number of items of the product that are available. Because the subset of customers was selected from the set of customers, each customer in the record 1006 includes a flag 1008 next to their name. In some implementations, the subset of customers may be selected in step 516 of the method 500 from the set of customers.

The web resource 1002 further includes an option 1010 to edit the record 1004, the record 1006 and/or the customers in the set of customers (i.e., the customers with a flag 1008 next to their name). This editing may be performed manually by the merchant via user input at the merchant device 600.

After the start time for the flash sale defined in the box 606, each customer in the subset of customers may be permitted to originate an order for the product by performing a checkout process. The e-commerce platform may prevent origination of an order for the product on behalf of a customer that is excluded from the set of customers and/or the subset of customers. This may reduce the number of transaction requests received and/or processed by the e-commerce platform during the flash sale. Without such a reduction in the number of transaction requests, the e-commerce platform might receive a surge of orders shortly after the start time of the flash sale that could exceed the capacity of the e-commerce platform. This might result in decreased responsiveness, system crashes and/or other degradations to the customer experience.

Figure 11:
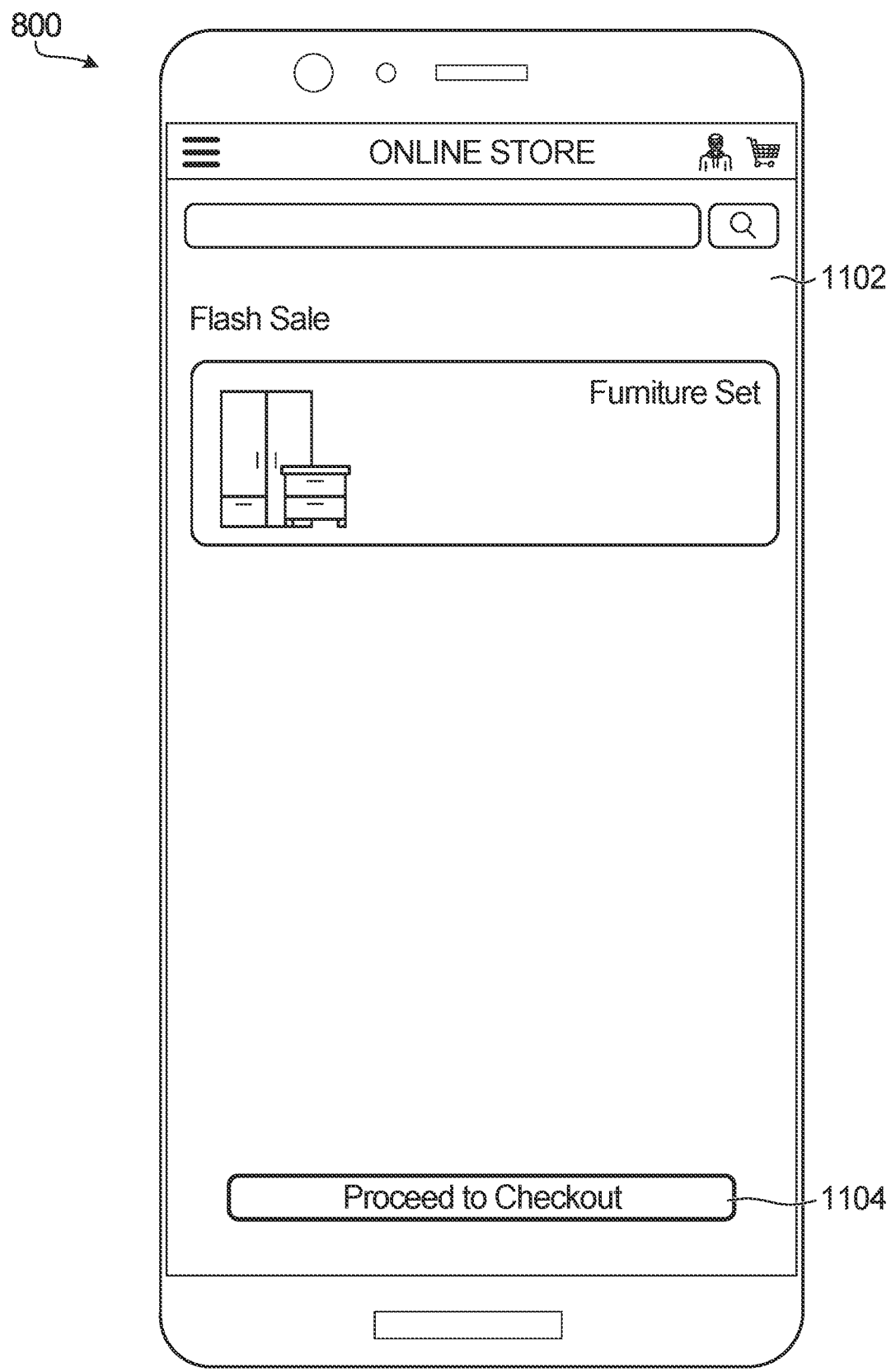
FIG. 11 illustrates the customer device of FIG. 8 displaying a further web resource of the online store.

FIG. 11 illustrates the customer device 800 displaying a further web resource 1102 of the online store. The web resource 1102 may be considered a product page for the flash sale that was generated after the start time of the flash sale. In this example, the first customer associated with the customer device 800 is included in the subset of customers for the flash sale, and therefore the web resource 1102 includes an option 1104 to purchase the product during the flash sale. Selection of the option 1104 may initiate a checkout process to generate and send an order for the product to the e-commerce platform. The e-commerce process may process the order in step 518 of the method 500, for example.

Figure 12:
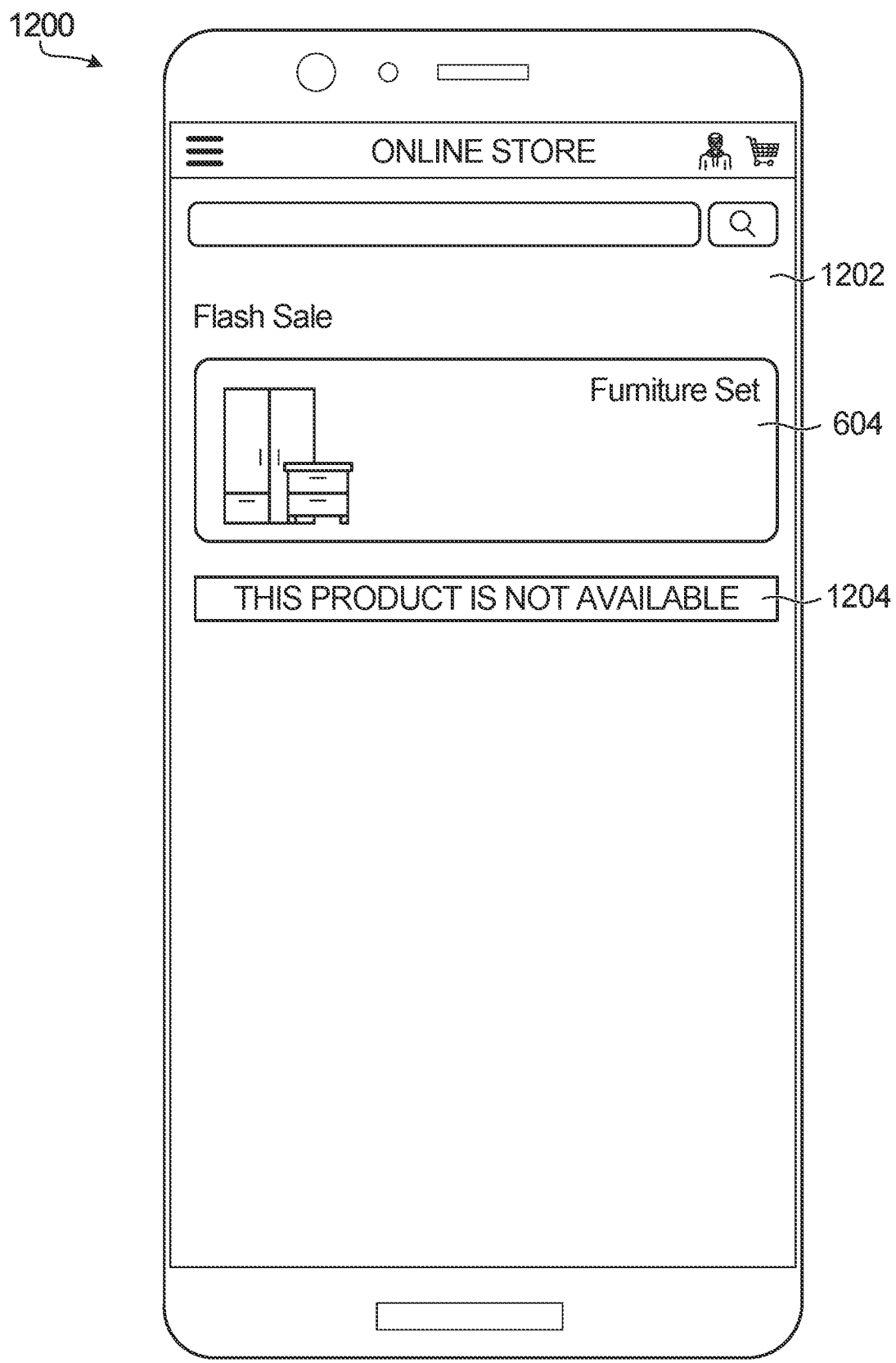
FIG. 12 illustrates another customer device displaying a web resource of the online store of FIG. 6.

FIG. 12 illustrates another customer device 1200 displaying a web resource 1202 of the online store. The customer device 1200 is associated with a second customer that is excluded from the subset of users shown in the record 1006 and/or from the set of users identified using the flags 1008 in the web resource 1002. As such, the web resource 1202 excludes the option 1104 and therefore denies the second customer the option to purchase the product. This is an example of preventing origination of an order for the product on behalf of the second customer, which may be performed in step 510 of the method 500, for example. The web resource 1202 instead includes an indication 1204 that the product is not available.

The web resources 602, 702, 802, 902, 1002, 1102, 1202 are examples of webpages or screen pages that may be presented via a web browser and/or a mobile application, for example. While the merchant device 600 and the customer devices 800, 1200 are illustrated as mobile phones in FIGS. 6-12, this is only an example. Other types of devices are also contemplated. For example, when displayed on a desktop computer, the web resources 602, 702, 1002 may be rendered similar to the homepage shown in FIG. 2.

CONCLUSION

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method implemented by a processor of an e-commerce platform, the method comprising:
   receiving, by the processor from a merchant device, at least one defined condition for a particular transaction request;
   obtaining, by the processor, online activity information pertaining to a plurality of users;
   determining, by the processor based on the online activity information, that each user of the plurality of users is a candidate for sending the particular transaction request to a computing system;
   selecting, by the processor based on the at least one defined condition for the particular transaction request, a set of users from the plurality of users;
   receiving, by the processor, a request for a webpage from a web browser or an application installed on a customer device of a particular user; and
   generating, by the processor, an instruction to render the webpage for the particular user, wherein the instruction to render the webpage excludes an option to send the particular transaction request to the computing system when the particular user is excluded from the set of users and includes the option to send the particular transaction request to the computing system when the particular user is included in the set of users.

2. The method of claim 1, wherein selecting the set of users comprises comparing, by the processor, the at least one defined condition to user information pertaining to the plurality of users.

3. The method of claim 2, wherein the user information comprises labels assigned to the plurality of users by the computing system.

4. The method of claim 2, wherein the user information pertaining to the plurality of users comprises at least one of:
   an assessment of automated user activity; and
   location data.

5. The method of claim 1, wherein the particular user is excluded from the set of users, and wherein generating the instruction to render the webpage for the particular user excluded from the set of users includes denying, by the processor, the particular user excluded from the set of users an option to purchase an associated product from the computing system.

6. The method of claim 1, further comprising transmitting, by the processor, a record of the set of users to the computing system.

7. The method of claim 1, further comprising assigning, by the processor, each user in the set of users a label for the particular transaction request.

8. The method of claim 1, further comprising:
   determining, by the processor, a number of transaction requests that can be completed at the computing system;

selecting, by the processor, a subset of users from the set of users based on the number of the transaction requests; and processing, by the processor, a transaction request for each user of the subset of users.

9. The method of claim 1, wherein the instruction to render the webpage includes the option to send the particular transaction request to the computing system, and wherein responsive to the option to send the particular transaction request to the computing system being submitted by the particular user, sending, by the processor, the particular transaction request to the computing system.

10. A system comprising:
an e-commerce platform comprising:
memory to store online activity information pertaining to a plurality of users; and
at least one processor to:
receive, from a merchant device, at least one defined condition for a particular transaction request;
determine, based on the online activity information, that each user of the plurality of users is a candidate for sending the particular transaction request to a computing system;
select, based on the at least one defined condition for the particular transaction request, a set of users from the plurality of users;
receive a request for a webpage from a web browser or an application installed on a customer device of a particular user; and
generate, by the processor, an instruction to render the webpage for the particular user, wherein the instruction to render the webpage excludes an option to send the particular transaction request to the computing system when the particular user is excluded from the set of users and includes the option to send the particular transaction request to the computing system when the particular user is included in the set of users.

11. The system of claim 10, wherein:
the memory is to store user information pertaining to the plurality of users; and
the at least one processor is to compare the at least one defined condition to the user information to select the set of users.

12. The system of claim 11, wherein the user information comprises labels assigned to the plurality of users by the computing system.

13. The system of claim 11, wherein the user information pertaining to the plurality of users comprises at least one of:
an assessment of automated user activity; and
location data.

14. The system of claim 10, wherein when the particular user is excluded from the set of users, the webpage denies the particular user excluded from the set of users an option to purchase an associated product from the computing system.

15. The system of claim 10, wherein the at least one processor is to transmit a record of the set of users to the computing system.

16. The system of claim 10, wherein the at least one processor is to assign each user in the set of users a label for the particular transaction request.

17. The system of claim 10, wherein the at least one processor is to:
determine a number of transaction requests that can be completed at the computing system;
select a subset of users from the set of users based on the number of the transaction requests; and
process a transaction request for each user of the subset of users.

18. The system of claim 10, wherein the instruction to render the webpage includes the option to send the particular transaction request to the computing system, and wherein responsive to the option to send the particular transaction request to the computing system being submitted by the particular user, the at least one processor is to send the particular transaction request to the computing system.

19. A non-transitory computer readable medium storing computer executable instructions which, when executed by a processor of an e-commerce platform, cause the processor of the e-commerce platform to perform operations comprising:
receiving, from a merchant device, at least one defined condition for a particular transaction request;
obtaining online activity information pertaining to a plurality of users;
determining, based on the online activity information, that each user of the plurality of users is a candidate for sending the particular transaction request to a computing system;
selecting, based on the at least one defined condition for the particular transaction request, a set of users from the plurality of users;
receiving a request for a webpage from a web browser or an application installed on a customer device of a particular user; and
generating, an instruction to render the webpage for the particular user, wherein the instruction to render the webpage excludes an option to send the particular transaction request to the computing system when the particular user is excluded from the set of users and includes the option to send the particular transaction request to the computing system when the particular user is included in the set of users.

20. The non-transitory computer readable medium of claim 19, wherein the instruction to render the webpage includes the option to send the particular transaction request to the computing system, and wherein responsive to the option to send the particular transaction request to the computing system being submitted by the particular user, sending the particular transaction request to the computing system.

* * * * *